US012795215B2

(12) United States Patent
Doken et al.

(10) Patent No.: US 12,795,215 B2
(45) Date of Patent: Nov. 10, 2026

(54) SYSTEMS AND METHODS FOR IMPROVED CONTENT ITEM DELIVERY AND OUTPUT

(71) Applicant: Adeia Guides Inc., San Jose, CA (US)

(72) Inventors: Serhad Doken, Bryn Mawr, PA (US); Tao Chen, Palo Alto, CA (US); Ning Xu, Irvine, CA (US); Zhiyun Li, Kenmore, WA (US); Cato Yang, San Jose, CA (US)

(73) Assignee: Adeia Guides Inc., San Jose, CA (US)

(*) Notice: Subject to any disclaimer, the term of this patent is extended or adjusted under 35 U.S.C. 154(b) by 33 days.

(21) Appl. No.: 18/901,456

(22) Filed: Sep. 30, 2024

(65) Prior Publication Data

US 2026/0095635 A1 Apr. 2, 2026

(51) Int. Cl.

*H04N 21/854* (2011.01)
*H04N 21/439* (2011.01)
*H04N 21/44* (2011.01)
*H04N 21/462* (2011.01)

(52) U.S. Cl.

CPC ....... *H04N 21/854* (2013.01); *H04N 21/4394* (2013.01); *H04N 21/44008* (2013.01); *H04N 21/4621* (2013.01)

(58) Field of Classification Search

None

See application file for complete search history.

(56) References Cited

U.S. PATENT DOCUMENTS 5,966,120 A * 10/1999 Arazi ................. H04N 21/4508 375/E7.269
9,800,951 B1 * 10/2017 Carlson .............. H04N 21/4532
10,972,772 B2 4/2021 Hunt
2011/0299593 A1 * 12/2011 Pettersson ............ H04N 19/573 375/240.03
2012/0249869 A1 10/2012 Tian et al.
2016/0323606 A1 * 11/2016 Mao ................. H04N 21/64707
2021/0185405 A1 * 6/2021 Panchaksharaiah .......................... H04N 21/4884
2022/0141531 A1 * 5/2022 Gupta .............. H04N 21/23418 713/320

(Continued)

OTHER PUBLICATIONS

"L2 Syntactic Complexity Analyzer", Wikipedia, Retrieved on Oct. 24, 2024,3 pages, Retrieved from https://en.wikipedia.org/wiki/L2_Syntactic_Complexity_Analyzer.

(Continued)

*Primary Examiner* — Jason K Lin
(74) *Attorney, Agent, or Firm* — HG LAW LLP

(57) ABSTRACT

Methods and systems, implemented by a device e.g., a server or computing device, for enabling the improved output of multiple content items are provided so as to e.g., limit communication network bandwidth resources requested to deliver, from the server to the computing device, portions of the multiple content items. A content item comprising at least a plurality of portions is received at a computing device. A first complexity score associated with the plurality of portions is determined. It is identified that the first complexity score is below a threshold complexity score. A length of the plurality of portions is above a threshold length. And a portion of the plurality of portions of the content item is generated for simultaneous output.

20 Claims, 11 Drawing Sheets

(56) References Cited

U.S. PATENT DOCUMENTS

| | | | | |
|---|---|---|---|---|
| 2023/0089118 A1* | 3/2023 | Qu | H04N 21/472 | 725/59 |
| 2023/0283783 A1* | 9/2023 | Moussaoui | H04N 19/154 | 725/9 |

OTHER PUBLICATIONS

"Seam carving", Wikipedia, Retrieved on Oct. 24, 2024, 7 pages, retrieved from https://en.wikipedia.org/wiki/Seam_carving.

Ferreira, T,A,F,R., "Entropy-Based Dynamic Ad Placement Algorithms for In-Video Advertising", Dissertation, University of Beira Interior Engineering, Advisor, Prof. Doutor Abel João Padrão Gomes, Jun. 2014, 92 pages.

Rubinstein, M. et al., "Improved Seam Carving for Video Retargeting", ACM Transactions on Graphics (TOG), vol. 27, Issue 3,Aug. 1, 2008, pp. 1-9.

* cited by examiner

Fig. 10 (Cont. I)
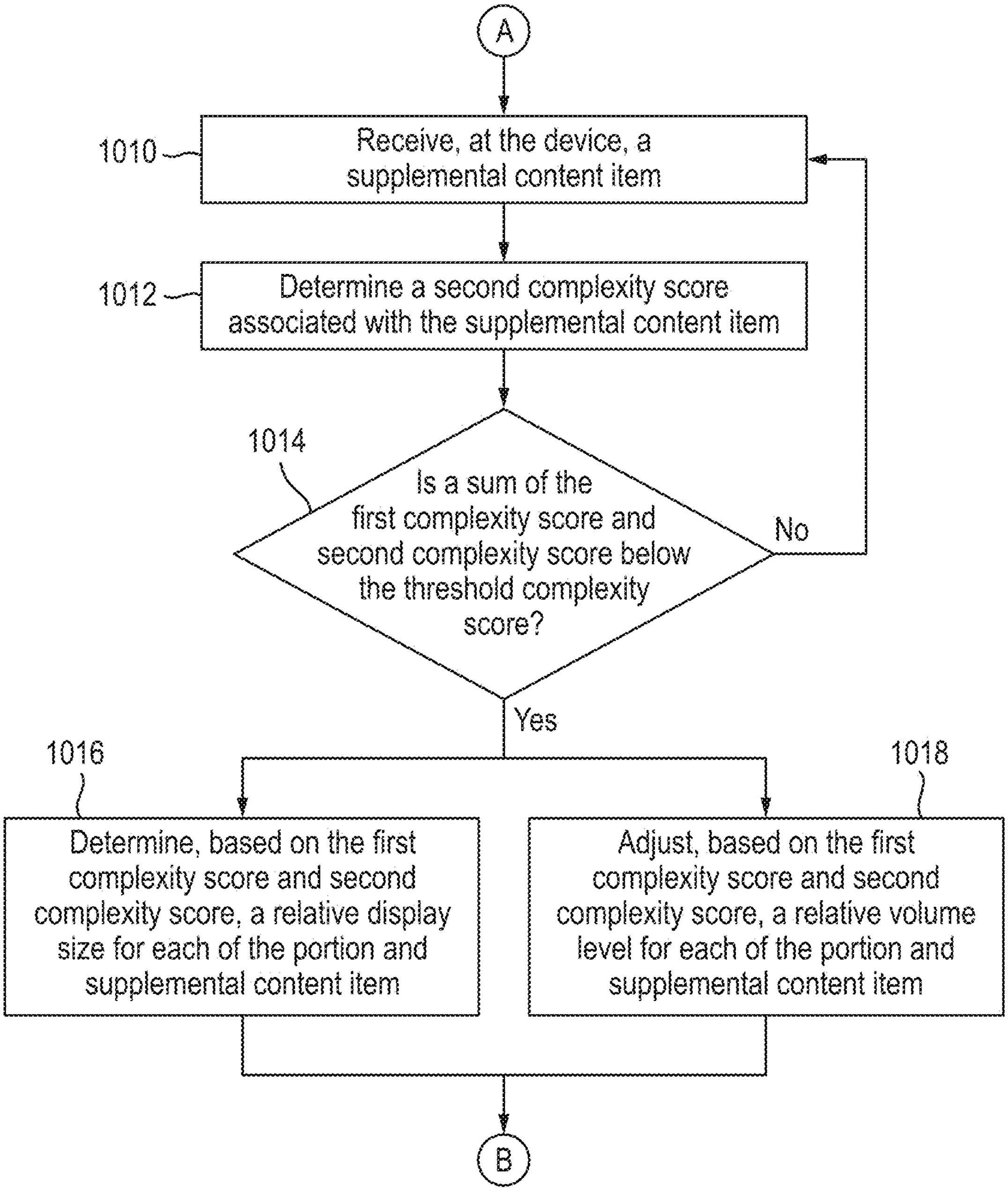

Fig. 10 (Cont. II)
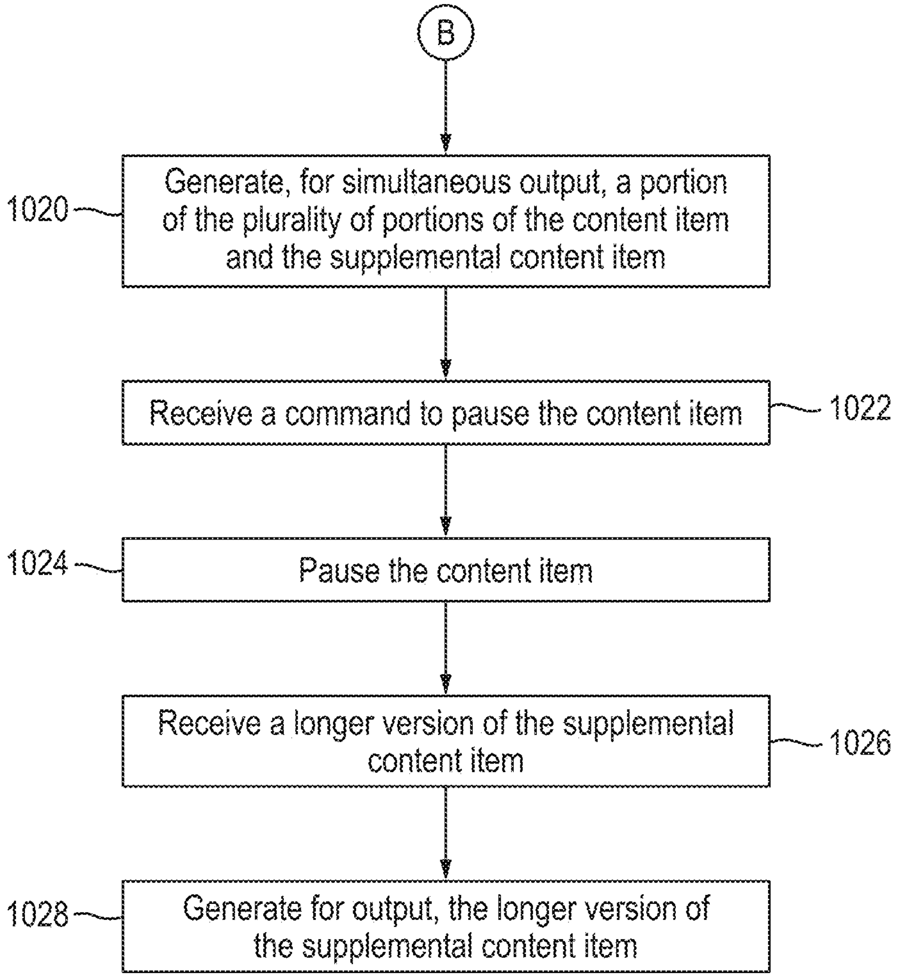

SYSTEMS AND METHODS FOR IMPROVED CONTENT ITEM DELIVERY AND OUTPUT

BACKGROUND

One or more disclosed embodiments are directed towards systems and methods for enabling the improved and coordinated output of multiple content items. Some embodiments or aspects relate to additional or alternative features, functionalities, and/or fields.

SUMMARY

With the widespread availability of streaming media, such as a video on demand (VOD) programs, via over-the-top (OTT) platforms, such as Netflix or Disney+, there is an expectation that streamed media will be available as and when it is requested. Media may comprise audio, video and/or audiovisual content items, and is typically streamed via the internet and, for video content items, may require a relatively large amount of bandwidth over the period of streaming. In order to reduce and manage the bandwidth requirements of streaming media, media items may be compressed, delivered in an optimized manner, such as via variable bitrate streaming, and/or delivered via a content delivery network (CDN) that makes use of localized delivery servers. Despite these optimized ways of delivering streamed media, inefficiencies are still present in the system. For example, a streamed TV program, such as a streamed F1 race, may have portions of relatively high complexity, such as when the stream comprises multiple F1 cars racing, and periods of relatively low complexity, such as when a commentator is speaking into a microphone in front of a static background. The high-complexity portions of the TV program may have relatively high bandwidth requirements, and the low-complexity portions of the TV program may have relatively low bandwidth requirements. However, the system will still need to be configured in order to provide enough bandwidth to deliver the relatively high-complexity portions of the TV program, and excess bandwidth capacity may go unused in the relatively low-complexity portions of the TV program. In addition, some content delivery platforms may deliver multiple content items simultaneously. For example, an OTT platform may deliver a first content item, such as a TV program, and a supplemental content item, such as a director's commentary video, at the same time. If the supplemental content item is delivered at the same time as a period of high complexity in the first content item, then a peak in bandwidth associated with the first content item may be increased further by the bandwidth requirements of the supplemental content item.

There is thus a need for methods and systems for enabling the improved output of multiple media assets (e.g., a first content item and a supplemental content item) based on a logic configured to regulate the amount of data transferred from a server to a computing device and the communication network bandwidth requested to transfer those data. For instance, this logic takes into account the complexity of each media asset of the multiple media assets and/or the maximum complexity load a user may withstand, corresponding to the conscious and simultaneous consumption of the multiple media assets. The complexity of a media asset may be associated with a number of different factors related to visual and/or audio content contained in the media asset. In some examples, the complexity may be based on, for example, how many foreground objects are present in the video of a media asset and how the objects move. A relatively complex media asset may be larger in size due to its larger amount of content information, and a relatively less complex media asset may be smaller in size due to its lower amount of content information, when considering that both media assets have the same image resolution. This in turn, may impact, for example, encoding and streaming requirements. Without the logic disclosed herein, there may be instances where part of the content presented through the presentation of both the content item and supplemental content item would not be assimilated by the user by exceeding their maximum complexity load. Part of the communication network bandwidth requested to forward, from the server to the computing device, the content excess (that cannot be assimilated by the user) would be accordingly wasted.

Methods and systems, e.g., implemented by a server or a computing device, are disclosed herein for providing, for simultaneous output, a content item and a supplemental content item. In particular, some methods and systems are disclosed herein for providing, for simultaneous output, a content item and a supplemental content item, based on logic, wherein a sum or other combination of respective complexity scores (for example, based on an amount of visual and/or audio content information, an amount of data, or an amount of encoded data) of the content item and the supplemental content item is below a threshold complexity score (e.g., which is user-dependent or user category-dependent) that corresponds to the user's maximum complexity load. A combination of respective complexity scores may comprise, for instance, a weighted sum of respective complexity scores, or a ratio involving the respective complexity scores. Such methods and systems may improve data management by setting a maximum amount of data (a user could assimilate) that is delivered, from a server to a computing device. This helps to reduce, for instance, the space occupied in a buffer (e.g., decoding buffer and/or display buffer) of the computing device. In some instances, audio content of a media asset comprises at least one of e.g., verbal content, music content or noise content. Such methods and systems may further improve the rationalization of the usage of the communication network bandwidth requested to deliver, from the server to the computing device, frames or segments of the content item and supplemental content item by decreasing the requested communication network bandwidth due to the setting of the threshold complexity score, and/or smoothing out the requested communication network bandwidth by outputting the supplemental content item during the output of the least complex plurality of portions of the content item.

In some examples, a content item comprising at least a plurality of portions is received at a computing device. A first complexity score associated with the plurality of portions is determined. It is identified that the first complexity score is below a threshold complexity score. It is determined that a length of the plurality of portions is above a threshold length. A portion of the plurality of portions of the content item and a supplemental content item are generated for simultaneous output.

In some instances, a portion of the plurality of portions of the content item may comprise a frame, a plurality of frames, a segment, or a plurality of segments. In some instances, the supplemental content item may comprise a number of frames (or segments) lower than the number of frames (or segments) the content item comprises. In some instances, the supplemental content item and the plurality of portions of the content item may each comprise a respective number of frames (or segments) associated with a respective frame (or segment) rate such that the supplemental content item and the plurality of portions of the content item have an identical frame (or segment) presentation duration, the frame (or segment) presentation duration being the product of the number of frames (or segments) by the frame (or segment) rate. For instance, a frame rate may be expressed as a number of frames per second.

In some instances, a device (e.g., a server or a computing device) may determine a first complexity score associated with at least a portion of the content item before the user requests the at least a portion of the content item to consume it or the at least a portion of the content item starts being presented. In some instances, the first complexity score may be based on an amount of content information (e.g., audio and/or visual content information, language content information) associated with the plurality of portions of the content item. In some instances, the first complexity score may be based on an amount of data (expressed, for example, in bytes) corresponding to the amount of content information (e.g., audio and/or visual content information, language content information) associated with the plurality of portions of the content item. In some instances, the first complexity score may be based on an amount of encoded data (expressed, for example, in bytes) corresponding to the amount of data corresponding to the amount of content information (e.g., audio and/or visual content information, language content information) associated with the plurality of portions of the content item. The encoded data may correspond to the data, corresponding to the content information (e.g., audio and/or visual content information, language content information) associated with the plurality of portions of the content item, that have been encoded using a codec in order to reduce the amount of the data and facilitate the delivery, from a server to a computing device, of the data as encoded data. The encoded data may then be decoded at the computing device.

In some instances, the threshold complexity score may be based on a maximum complexity load a user could assimilate. In some instances, a user's maximum complexity load may be determined by subjecting the user to a questionnaire based on examples of simultaneous output of a plurality of portions of various content items and various supplemental content items. A respective complexity score is associated with each content item of the various content items and each supplemental content item of the various supplemental content items. The responses to the questions of the questionnaire may allow for determining whether the user is able to comprehend both media assets. In some instances, a user's maximum complexity load may be determined by tracking, in real time, the user's activity during the simultaneous output of a plurality of portions of the content item and the supplemental content item. In some instances, the user's activity comprises at least one of user gestures, user facial expressions, user gaze movements or user speech or sounds, all resulting from the active consumption of at least one of the media assets simultaneously output. If the user consumes, for instance, a media asset of the horror genre, the user may be terrified by a scene. During the scene, the user may thus scream, divert their gaze from the content item, obstruct their field of view using their hands (or by closing their eyes), make a startled movement. Additionally or alternatively, the user's activity comprises user interface inputs (e.g., vocal and/or tactile) to control the presentation of at least one of the media assets. If the user consumes, for instance, a media asset of the horror genre, the user may be terrified by a scene. The user may thus pause or fast forward the terrifying scene or even stop the presentation of the content item. Tracking the user's activity may allow for determining whether the user is able to comprehend both media assets. Determining a user's maximum complexity load may allow for personalizing the threshold complexity score and for preferentially subjecting a user to types of supplemental content items they are the most receptive to. In some instances, a user's maximum complexity load may be based on identifying to which population the user belongs, the population being defined by one or more parameters such as age range, buying power range, cultural background range and/or educational background range. A respective maximum complexity load associated with the population to which the user belongs is assigned to the user.

In some instances, the threshold complexity score, which may be based on the maximum complexity load the user could assimilate, is expressed as a maximum amount of content information (e.g., audio and/or visual content information, language content information) associated with at least one portion of the content item and the supplemental content item, a maximum amount of data corresponding to the content information (e.g., audio and/or visual content information, language content information) associated with at least one portion of the content item and the supplemental content item, or a maximum amount of encoded data corresponding to the maximum amount of the data corresponding to the content information (e.g., audio and/or visual content information, language content information) associated with at least one portion of the content item and the supplemental content item. In some instances, when the threshold complexity score based on the maximum complexity load the user could assimilate is expressed as a maximum amount of encoded data (corresponding to the maximum amount of data corresponding to the maximum amount of content information—e.g., audio and/or visual content information, language content information-associated with at least one portion of the content item and the supplemental content item), the threshold complexity score may be divided by the presentation duration (corresponding to the overlap of presentation durations of the at least one portion of the content item and supplemental content item) so as to provide a maximum amount of encoded data per time unit. The maximum amount of encoded data per time unit may be compared to a bandwidth (e.g., current or predicted bandwidth) of an available communication network (to which the computing device belongs) so as to determine the percentage of the bandwidth it corresponds to. Because a user has a limited capability of processing visual and/or audio information, there may be no point in presenting, to the user, a quantity of information exceeding the user's maximum complexity load. Determining the maximum complexity load of a user may thus allow for rationalizing the use of the bandwidth of the available communication network, requested to deliver, from a server to a computing device, frames or segments of the content item and supplemental content item.

In some instances, the threshold length may be associated with a number of frames or segments the content item comprises. In some instances, the threshold length may be associated with a number of frames the content item comprises and a frame rate, e.g., a number of frames per second at which the number of frames is displayed. In some instances, the threshold length may be associated with a number of segments the content item comprises and a segment rate, e.g., a number of segments per a time unit at which the number of segments is displayed (when each segment has a same constant number of frames). Alternatively, the threshold length may be associated with a frame (or segment) presentation duration corresponding to the product of the number of frames by the frame rate (or the product of the number of segments by the segment rate). In some instances, the presentation duration may be equal to five minutes or more. In some instances, the supplemental content item may be a media asset different from the content item. In some instances, the supplemental content item may comprise content associated with the content item (e.g., highlights of a previous episode of a TV series to understand a scene of the episode being presented; deleted portions of the content item being presented due to censorship or resulting from a cut performed by a movie director or movie studio; advertisements associated with objects, characters, actors or events in the content item being presented). In some examples, the supplemental content item may comprise content unassociated with the content item (e.g., advertisements unassociated with objects, characters, actors or events in the content item being presented). In some examples, the supplemental content item may comprise content based on a user profile, in which information is stored, such as demographics, interests, socioeconomic status, internet search history, content item search history, content item consumption history.

In some examples, a second complexity score may be associated with the supplemental content item. The identifying that the first complexity score is below the threshold complexity score may comprise identifying that a sum (or other combinations) of the first complexity score and the second complexity score is below the threshold complexity score.

Hereby, it may be possible to keep the amount of visual and/or audio content information from the content item and the supplemental content simultaneously output below the threshold complexity score, resulting in the saving of the requested communication network bandwidth. In some instances, a device (e.g., a server or a computing device) may determine a second complexity score associated with a supplemental content item before the user requests the at least a portion of the content item or before the at least a portion of the content item starts being presented.

In some instances, the identifying that the first complexity score is below the threshold complexity score may comprise identifying that a weighted sum of the first complexity score and the second complexity score is below the threshold complexity score. A respective weight is assigned to each of the first complexity score and the second complexity score. The respective weight assigned to the first complexity score may be based on a display portion assigned to the content item for the presentation of the content item. Similarly, the respective weight assigned to the second complexity score may be based on a display portion assigned to the supplemental content item for the presentation of the supplemental content item.

In some examples, the generating the portion of the plurality of portions, and the supplemental content item for simultaneous output may further comprise generating the portion and the supplemental content item for display. The generating the portion and the supplemental content item for simultaneous output may further comprise determining, based on the first complexity score and the second complexity score, a relative display size of the portion.

In some instances, a display may accommodate the presentation of both the content item and supplemental content item on respective parts of the display. In some instances, the display may be made of one or more sub-displays belonging to one or more computing devices. Each respective part of the display may encompass a part of at least one sub-display and/or at least one sub-display. In some instances, a non-transitory computer-readable medium may comprise instructions that, when executed by control circuitry of a device (e.g., a server or a computing device of the one or more computing devices) cause the control circuitry to (1) access at least one of the first complexity score associated with the plurality of portions of the content item and second complexity score associated with the supplemental content item, and (2) delineate, on the display (e.g., made of the one or more sub-displays belonging to the one or more computing devices) at least one of the display size of the plurality of portions of the content item and the display size of the content item. The numberings in parentheticals (e.g., (1), (2), (3), etc.) as used herein and also hereinafter, are for identifying relevant or related examples, or aspects, and is not intended to be limiting or to specify a particular order, sequence, or quantity.

In some instances, the display size of the portion of the plurality of portions of the content item may be proportional to the first complexity score: the larger the first complexity score, the larger the display size of the portion of the plurality of portions of the content item, which may result in an improved user perception of the plurality of portions of the content item. Similarly, the display size of the supplemental content item may be proportional to the second complexity score. In some instances, the display size of the portion of the plurality of portions of the content item is proportional to the ratio of the first complexity score to the second complexity score. This may allow for delineating, on a display made of one or more sub-displays belonging to one or more computing devices, a display size for each of the plurality of portions of the content item and supplemental content item, while providing a larger share of the display to the most complex media asset (e.g., the plurality of portions of the content item or supplemental content item) so as to render the user perception of the most complex media asset easier. Similarly, the display size of the supplemental content item may be proportional to the ratio of the second complexity score to the first complexity score. In some instances, the display size of the content item may remain the same over the course of its presentation, while the display size of the supplemental content item may depend upon the ratio of the second complexity score to the first complexity score, possibly leaving a part of the display (e.g., made of one or more sub-displays belonging to one or more computing devices) unused.

In some instances, a device (e.g., a server or a computing device of the one or more computing devices) may crop at least one or more frames of the content item and/or at least one or more frames of the supplemental content item, while the uncropped part of each frame that has been cropped contains the most important visual content of the each frame prior to the cropping of the each frame. This may allow for allocating more display size to the most important portion of visual content contained in a frame of the content item and/or supplemental content item. The device may implement sophisticated dynamic cropping techniques that crop at least one or more frames such that the cropped portion of the one or more frames may be identical or different across the one or more frames, the goal of said techniques being to retain the most important portion of visual content in each frame.

Additionally or alternatively, the device may implement 'seam carving', a technique that allows for e.g., removing one or more arrays of pixels in an image (e.g., a frame), resulting in the removal of one or more unimportant elements from the image. Seam carving also allows for e.g., maintaining, in an image (e.g., a frame), arrays of pixels related to one or more elements (in the image) deemed important, and adding arrays of pixels to extend the image. Seam carving may result in the resizing (e.g., increase or decrease of the image size) of an image depending on the operations implemented during the seam carving of an image: the removal of an array of pixels from an image decreases the size of the image while the addition of an array of pixels into the image increases the size of the image. In some instances, the device (e.g., a server or a computing device of the one or more computing devices) may crop at least one or more frames of the content item so as to allocate more display size than what was initially allocated to at least one or more frames of the supplemental content item. In some other instances, the reverse situation may occur.

In some instances, the device (e.g., a server or a computing device of the one or more computing devices) may implement a seam carving on at least one or more frames of the content item to reduce the size of the at least one or more frames of the content item in order to allocate more display size than that was initially allocated to at least one or more frames of the supplemental content item. In some other instances, the reverse situation may occur. In some instances, the device (e.g., a server or a computing device of the one or more computing devices) may implement a seam carving on at least one or more frames of the content item to increase the size of the at least one or frames of the content item in order to allocate less display size than that was initially allocated to the supplemental content item. In some instances, a non-transitory computer-readable medium may comprise instructions that, when executed by control circuitry of a device (e.g., a server or a computing device of the one or more computing devices), cause the control circuitry to crop at least one or more frames of the content item and/or at least one or more frames of the supplemental content item while the uncropped part of each frame (that has been cropped) contains the most important visual content of the each frame prior to the cropping of the each frame.

In some instances, a device (e.g., a server or a computing device of the one or more computing devices) may combine a frame of the content item with a frame of the supplemental content item so as to generate for display a split frame, a first portion of the split frame comprising the frame of the content item and a second portion of the split frame comprising the frame of the supplemental content item. In some instances, the device may determine the size of the first portion of the split frame based on the first complexity score associated with the frame of the content item or on the ratio of the first complexity score to the second complexity score associated with the frame of the supplemental content item. In some instances, the device may determine the size of the second portion of the split frame based on the second complexity score associated with the frame of the supplemental content item or on the ratio of the second complexity score to the first complexity score associated with the frame of the content item. In some instances, a sum of the first complexity score and second complexity score may be below a threshold complexity score. In some instances, prior to the combination of the frame of the content item and the frame of the supplemental content item, the device may implement some cropping and resizing techniques and/or 'seam carving' on either or both frames and generate for display the split frame.

In some instances, the display may be an augmented reality (AR) or virtual reality (VR) display, worn by a user, that presents two-dimensional or three-dimensional images. In three-dimensional images projected on the AR or VR display, additional parameters (besides the display size of the plurality of portions of the content item) can be varied, such as a depth of the display size of the plurality of portions of the content item and a perceptual distance, relative to the user, of the display size of the plurality of portions of the content item. In some instances, the display size of the plurality of portions of the content item and depth of the display size of the plurality of portions of the content item may be proportional to the first complexity score while the perceptual distance of the display size is inversely proportional to the first complexity score. The more complex the plurality of portions of the content item, the larger the display size, the larger the depth and the lower the perceptual distance so as to render the plurality of portions of the content item easier to comprehend. Similarly, the display size of the supplemental content item and depth of the display size of the supplemental content item may be proportional to the second complexity score, while the perceptual distance of the display size may be inversely proportional to the second complexity score. In some instances, the display size of the plurality of portions of the content item and depth of the display size of the plurality of portions of the content item may be proportional to a ratio of the first complexity score to the second complexity score, while the perceptual distance of the display size is inversely proportional to said ratio. Similarly, the display size of the supplemental content item and depth of the display size of the supplemental content item may be proportional to a ratio of the second complexity score to the first complexity score, while the perceptual distance of the display size is inversely proportional to said ratio.

In some examples, determining the first complexity score may be further based on one or more of object analysis, color analysis, camera angle analysis, motion analysis, audio analysis and/or language analysis.

In some instances, a device (e.g., a server or a computing device of the one or more computing devices) may employ a computer vision algorithm to analyze each scene of a media asset (e.g., content item, the supplemental content item) and determine a complexity score associated with each scene of the media asset. This may allow for listing, for each frame of the media asset, each element (e.g., object, character, location) depicted in a frame and detected by the computer vision algorithm, and the evolution (e.g., movements, partial or full disappearances, appearance changes, etc.) of each depicted and detected element across frames. In some instances, the computer vision algorithm may determine a complexity score associated with a frame based on a number of elements depicted and detected in the frame and characteristics of the depicted and detected elements. In some instances, the computer vision algorithm may determine a complexity score associated with a plurality of frames based on a number of elements depicted and detected in each frame of the plurality of frames and characteristics of the depicted and detected elements, but also on the evolution of the depicted and detected elements across the plurality of frames and the evolution of the characteristics of the depicted and detected elements across the plurality of frames. In some instances, the computer vision algorithm may assign a respective weight to each depicted and detected element and/or one or more characteristics of each depicted and detected element in the determination of a complexity score associated with a frame of a media asset.

In some instances, a non-transitory computer-readable medium may comprise instructions that, when executed by the control circuitry of a device (e.g., a server or a computing device of the one or more computing devices), cause the control circuitry to (1) identify elements (e.g., objects, characters) depicted in frames, (2) determine locations (e.g., foreground, background) of the identified elements within frames, (3) determine characteristics (e.g., feature vectors, color gamut including, e.g., contrast, brightness, hue and color range) of the identified elements, (4) determine the amount of identified objects in each frame and whether the identified objects form clusters or not, and track the motions of the identified elements across frames, for example, of a same scene, so as to establish, for each frame, a list of the identified elements and information associated with the identified elements and determine, for each frame, a complexity score. As mentioned earlier, the numberings in parentheticals (e.g., (1), (2), (3), etc.) as used herein and also hereinafter, are for identifying relevant or related examples, or aspects, and is not intended to be limiting or to specify a particular order, sequence, or quantity.

In some instances, a device (e.g., a server or a computing device of the one or more computing devices) may run a cluster algorithm to determine how close a plurality of elements (e.g., objects, characters) are to each other. Clustered elements may involve a lower perceptual load (and thus a lower complexity) than un-clustered elements (which are thus distributed within a frame). In some instances, a non-transitory computer-readable medium may comprise instructions that, when executed by the control circuitry of a device (e.g., a server or a computing device of the one or more computing devices), cause the control circuitry to (1) determine features of frames excluding the identified elements such as color gamut (including, e.g., contrast, brightness, hue and color range, position of the colors in the frames excluding the identified elements), and (2) determine a complexity score for each frame for example.

In some instances, a non-transitory computer-readable medium may comprise instructions that, when executed by the control circuitry of a device (e.g., a server or a computing device of the one or more computing devices), cause the control circuitry to (1) access closed captions associated with the at least a portion of a media asset, (2) runs a language analysis on the accessed closed captions and (3) determine a complexity score associated with part (e.g., closed captions) of the visual content of the at least a portion of the media asset based on the cognitive load, for the user, associated with the accessed closed captions. The cognitive load is in turn based on the language complexity of the accessed closed captions. In some instances, the control circuitry acts as a syntactic analyzer to assess the language complexity of the accessed closed captions, and determine a complexity score associated with part of the visual content (e.g., closed captions) of the at least a portion of the media asset.

In some instances, a device (e.g., a server or a computing device of the one or more computing devices) may employ a virtual camera to analyze, in terms of camera angle changes, each scene of a media asset (e.g., the content item, the supplemental content item). In some instances, a non-transitory computer-readable medium comprises instructions that when executed by the control circuitry of a device (e.g., a server or a computing device of the one or more computing devices) cause the control circuitry to (1) analyze scenes (comprising a plurality of frames) of a media asset (e.g., the content item, the supplemental content item) so as to classify the scenes based on the occurrence of a predominant respective camera angle change (such as zoom-in, zoom-out, panning, cut, gradual transitions (e.g., fade in, dissolve), visual effects (e.g., blur, distort, etc.) and temporary camera immobility) in each scene, and (2) determine, for each classified scene, a complexity score associated with the classified scene based on the predominant respective camera angle change. For instance, a zoom-out may be associated with a higher complexity score than a zoom-in since the zoom-out results in encompassing more elements (e.g., objects, characters, locations) than the zoom-in. In some instances, the visual information associated with at least a portion of a media asset may comprise the classification, by the virtual camera, of scenes of a media asset: a complexity score associated with the at least a portion of a media asset comprises a component based on said classification. In some instances, the virtual camera may determine a complexity score associated with a plurality of frames by identifying and listing camera angle changes. In some instances, the virtual camera may determine a complexity score associated with a plurality of frames based on an amount of camera angle changes and characteristics of the camera angle changes across the plurality of frames. In some instances, the virtual camera may assign a respective weight to each identified camera angle change in the determination of a complexity score associated with a plurality of frames of a media asset. In some instances, the virtual camera may assign a respective weight to one or more characteristics of each identified camera angle change in the determination of a complexity score associated with a plurality of frames of a media asset.

In some instances, a device (e.g., a server or a computing device of the one or more computing devices) may employ a computer audio algorithm to analyze audio information associated with each frame or scene of a media asset (e.g., the content item, the supplemental content item) and determine a complexity score associated with the audio information associated with each frame or scene of the media asset (.

In some instances, a non-transitory computer-readable medium may comprise instructions that, when executed by the control circuitry of a device (e.g., a server or a computing device of the one or more computing devices), cause the control circuitry to (1) determine, from audio information associated with frames, audio characteristics (e.g., volume, frequency or pitch, number of sound sources, speed of the speech or audio velocity, audio volatility) and (2) determine a complexity score for each audio information associated with a frame. As referred to herein, the term "volatility" may mean the frequency at which the audio content associated with at least a portion of a media asset moves between a minimum value and a maximum value throughout the at least a portion of the media asset. In some instances, a non-transitory computer-readable medium may comprise instructions that, when executed by the control circuitry of a device (e.g., a server or a computing device of the one or more computing devices), cause the control circuitry to (1) transcribe speech from the audio content associated with at least a portion of a media asset, (2) runs a language analysis on the transcribed speech and (3) determine a complexity score associated with part (e.g., speech) of the audio content of the at least a portion of the media asset based on the cognitive load, for the user, of the transcribed speech. The cognitive load is in turn based on the language complexity of the transcribed speech. In some instances, the control circuitry acts as a syntactic analyzer to assess the language complexity of the transcribed speech, and determine a complexity score associated with part of the audio content (e.g., speech) of the at least a portion of the media asset.

In some instances, a device (e.g., a server or a computing device of the one or more computing devices) may employ a computer audio and vision algorithm to analyze visual and audio information associated with each frame or scene of a media asset (e.g., the content item, the supplemental content item) and determine a complexity score associated with each frame or scene of the media asset. In some instances, the device may employ both a virtual camera and a computer audio and vision algorithm to analyze visual and audio information associated with each frame or scene of a media asset and determine a complexity score associated with each frame or scene of the media asset.

In some examples, the plurality of portions is a first plurality of portions, and the content item may comprise a second plurality of portions adjacent to (e.g., consecutive to) the first plurality of portions. A second complexity score associated with the second plurality of portions may be determined. It may be identified that the second complexity score is below the threshold complexity score. The determining that the length of the plurality of portions is above the threshold length may be based on at least determining that a sum of the length of the first plurality of portions and the length of the second plurality of portions is above the threshold length. The generating the portion and the supplemental content item for simultaneous output may be further based on at least generating, for sequential output after the portion of the first plurality of portions and simultaneously with the supplemental content item, the second plurality of portions.

The supplemental content item may thus be simultaneously output with the second plurality of portions of the content item, after the output of the first plurality of portions of the content item. This may allow for outputting a supplemental content item after a runtime of the content item has reached a given value. In some instances, the supplemental content item may be output after a runtime of the content item equal to, for example, one or more seconds, or one or more minutes. In some instances, a supplemental content item of a plurality of supplemental content items may be simultaneously output with the content item each time the content item is presented in the absence of a supplemental content item for a given value of runtime. This may allow for distributing the plurality of supplemental content items along with the presentation of the content item. In some instances, a supplemental content item may be simultaneously output with the content item at the least (or less) complex plurality of portions of the content item (e.g., the plurality of portions of the content item having the lowest or lower first complexity score).

In some examples, the plurality of portions is a first plurality of portions, and the content item may comprise a second plurality of portions adjacent to (e.g., preceding) the first plurality of portions. A second complexity score associated with the second plurality of portions may be determined. It may be identified that the second complexity score is below the threshold complexity score. The determining that the length of the plurality of portions is above the threshold length may be based on at least determining that a sum of the length of the first plurality of portions and the length of the second plurality of portions is above the threshold length. The generating the portion and the supplemental content item for simultaneous output may be further based on at least generating, for sequential output, before the portion of the first plurality of portions and simultaneously with the supplemental content item, the second plurality of portions.

In some examples, the generating the portion and the supplemental content item for simultaneous output further may be based on at least adjusting a volume level of the content item.

In some instances, a device (e.g., a server or a computing device) may decrease the volume level of the content item so as to emphasize the presentation of the supplemental content item. In some instances, the device may increase the volume level of the content item so as to emphasize the presentation of the content item while presenting the supplemental content item. In some instances, the device may maintain the volume level of the content item as it is prior to the presentation of the supplemental content item, while a volume level of the supplemental content item starts at being higher than the volume level of the content item and monotonically decreases until the end of the supplemental content item, unless a pause command is received via a user interface to pause the content item. In that case, the volume level is to reach the volume level of the content item prior to the pausing of the content item. In some instances, when the volume level of one of the content item and supplemental content item is lower than the other, the device may generate for display closed captions for the one that is presented at a lower volume.

In some examples, the plurality of portions may be a plurality of segments of the content item. Adaptive bitrate streaming relies on the continuous delivery, from a server to a computing device, of segments whose bitrate must be lower than or equal to the communication network bandwidth. Otherwise, the delivery of segments and their presentation stop. Accordingly, each segment may be associated with a set of corresponding segments that differ in their respective bitrates (e.g., a set of segments, in which a set of frames of a segment is identical in content to a set of frames of another segment but differ in resolution).

In some examples, the threshold complexity score is based on a genre of the content item. A genre of the content item may be, for example, comedy, drama, fiction, science fiction, fantasy, action, horror, romance, thriller, historical, documentary, and the like. For instance, a content item of the comedy genre aims at making the largest amount of people laugh by presenting consecutive jokes and as such may be associated with a low-complexity score. For example, a content item of the action genre aims at presenting, e.g., spectacular stunts, rapid movements of characters, fights, or explosions and may be associated with a high-complexity score. In a content item of the fantasy genre or historical genre, costumes, makeup, languages and body movements of actors, as well as decor and music (e.g., soundtrack), are meant to immerse the user in an environment different from the user's daily environment. A content item of the fantasy genre may be thus associated with a high-complexity score. For example, a content item of the thriller genre may typically exhibit a higher complexity score than a documentary. Genres of content items allow for ranking content items, as the genres of the content items are associated with given ranges of complexity scores. Knowing the genre of a content item and the threshold complexity score assists in the determination of the characteristics (e.g., complexity score) of the desired supplemental content item to be generated for simultaneous output with the content item.

In some examples, a command to pause the content item is received. In response to the receiving the command, the content item is paused. A longer version of the supplemental content item is received. And the longer version of the supplemental content item is generated for output during the pausing the content item.

In some instances, when the device (e.g., server or computing device) receives the command to pause through a user interface, the computing device receives a longer version of the supplemental content item to be generated for output, e.g., on a display portion of the computing device, initially allocated to the presentation of the supplemental content item, or the entire display of the computing device. There may be multiple sets of supplemental content items. Each set of supplemental content items is associated with common content (e.g., objects, characters, events, frames or music), wherein each supplemental content item of a set of supplemental content items has a respective presentation duration. A longer version and a shorter version of a supplemental content item differ in their respective presentation durations, the longer version having a longer presentation duration than the shorter version for an identical frame rate. In some instances, a longer version of the supplemental content item comprises at least one frame from the shorter version of the supplemental content item. In some instances, the longer version of the supplemental content item comprises a frame sequence of a shorter version of the supplemental content item. In some instances, a longer version of the supplemental content item may comprise at least two frames of a shorter version of the supplemental content item arranged in a sequence different from a frame sequence of a shorter version of the supplemental content item.

In some examples, the content item may be received at a first bitrate. The generating the portion and the supplemental content item for simultaneous output may be further based on at least the fact that the content item is received at a second bitrate wherein the second bitrate is lower than the first bitrate. The generating the portion and the supplemental content item for simultaneous output may be further based on at least the fact that the received content item at the second bitrate is generated for display at a first display size. The generating the portion and the supplemental content item for simultaneous output may be further based on at least the fact that the supplemental content item is generated for display at a second display size.

By reducing the bitrate associated with frames or segments of the content item (in other words, by lowering the amount of data encoded or not), it is possible to reduce the first complexity score associated with the plurality of portions of the content item. This may further enable the complying with having the first complexity score below the threshold complexity score. In some instances, the supplemental content item may be available at various bitrates, and the supplemental content item will be generated for output at a lower bitrate in order to reduce the second complexity score associated with the supplemental content item.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
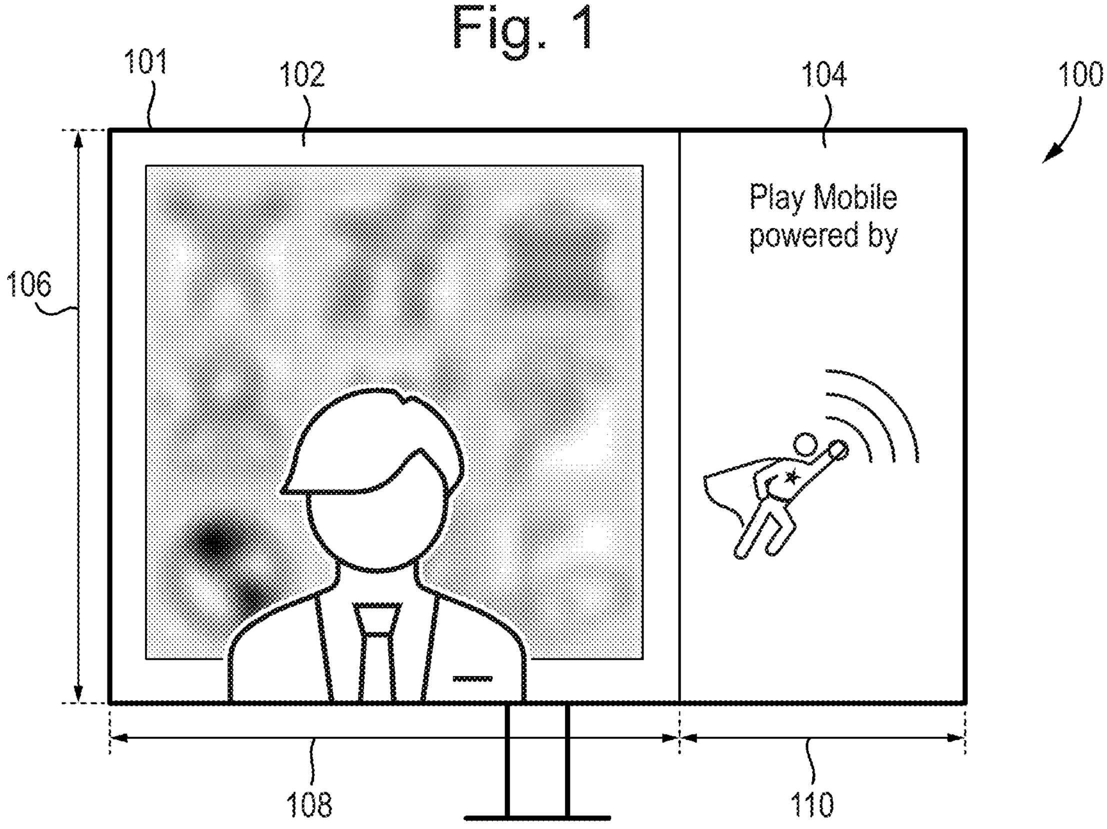
FIG. 1 represents an example for enabling the improved output of multiple content items, in accordance with some implementations of the disclosure.

As referred to herein, the terms "content item" and "media asset" comprise an electronically consumable user asset, such as an electronic version of a printed book, electronic television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, blogs, advertisements, chat sessions, social media, applications, games, and/or any other media or multimedia and/or combination of the same.

As referred to herein, the term "supplemental content item" comprises a media asset, for example, that is to be simultaneously output with another media asset (e.g., content item). The presentation time of the supplemental content item may not exceed that of the content item. In some examples, the supplemental content item comprises content related to the content item (e.g., highlights of a previous episode of a TV series to understand a scene of an episode—the episode being the content item; deleted portions of the content item due to censorship or resulting from cut performed by a movie director or movie studio; an object, a character, or an event of the content item, that are used to promote a product or service of a company in an advertisement—the advertisement being the supplemental content item; or an object, a character, or an event similar to an object, a character, or an event of the content item, respectively, the similar object, character or event being used to promote a product or service of a company in an advertisement—the advertisement being the supplemental content item). In some examples, the supplemental content item comprises content that is generally unrelated to the content item (e.g., advertisements), but that may be associated with user preferences to specifically target a user. In some instances, non-transitory computer-readable instructions encoded on a non-transitory computer-readable medium and executed by control circuitry of a computing device or server selects the supplemental content item based on user profiles, in which information is stored, such as demographics, interests, socioeconomic status, internet search history, content item search history, content item consumption history.

As referred to herein, the term "complexity score" of a media asset comprises a metric quantifying the amount of content information (e.g., audio and/or visual content information, language content information) associated with the media asset, a portion of the media asset or a plurality of portions of the media asset, that will be presented and consumed by a user. In some instances, the metric is based on analyzing visual and/or audio content information associated with each frame of the media asset or at least one or more frames of the media asset. In some instances, a complexity score associated with at least a portion of the media asset is equal to a sum or other combination of a complexity score associated with audio content of the at least a portion of the media asset and a complexity score associated with visual content of the at least a portion of the media asset:

$$\text{Complexity score}_{\text{associated with at least a portion of the media asset}} = \text{Complexity score}_{\text{associated with visual content of the at least a portion of the media asset}} + \text{Complexity score}_{\text{associated with audio content of the at least a portion of the media asset}}$$

In some instances, a complexity score associated with at least a portion of the media asset is equal to a sum or other combination of a complexity score associated with audio content of the at least a portion of the media asset, a complexity score associated with visual content of the at least a portion of the media asset and a complexity score associated with language content information of the at least a portion of the media asset:

$$\text{Complexity score}_{\text{associated with at least a portion of the media asset}} = \text{Complexity score}_{\text{associated with visual content of the at least a portion of the media asset}} + \text{Complexity score}_{\text{associated with audio content of the at least a portion of the media asset}} + \text{Complexity score}_{\text{associated with language content of the at least a portion of the media asset}}$$

In some instances, the complexity score associated with visual content of at least a portion of a media asset is based on one or more of object analysis, color analysis, camera angle analysis or motion analysis. In some instances, the complexity score associated with visual content of the at least a portion of a media asset may be determined or calculated using the following mathematical relationship:

$$\text{Complexity score}_{\text{associated with visual content of at least a portion of a media asset}} = \sum_{i=t_1}^{t_n} a_i \times \text{color gamut}(t) + \sum_{i=t_1}^{t_n} b_i \times \text{number of foreground objects}(t) + \sum_{i=t_1}^{t_n} c_i \times \text{number of background objects}(t) + \sum_{i=t_1}^{t_n} d_i \times \text{object motion vectors}(t) + \sum_{i=t_1}^{t_n} e_i \times \text{camera angle change}(t)$$

wherein the complexity score associated with the visual content of the at least a portion of the media asset, the color gamut, the number of foreground objects, the number of background objects, the object motion vectors and the camera angle change are all functions of time (e.g., runtime of the at least a portion of the media asset) and each of the color gamut, number of foreground objects, number of background objects, object motion vectors and camera angle change is assigned a respective weight (e.g., $a_i$, $b_i$, $c_i$, $d_i$, or $e_i$). In some instances, each weight of weights $a_i$, $b_i$, $c_i$, $d_i$ and $e_i$ is time-dependent: the respective value associated with each weight is a function of time. In some instances, each weight of weights $a_i$, $b_i$, $c_i$, $d_i$ and $e_i$ is time-independent: the value of each weight is not a function of time, and each weight may have a respective constant value irrespective of the time. Each time of times $t_1$ to $t_n$ represents a time at which a respective frame is located in a presentation sequence associated with the at least a portion of the media asset.

In some instances, the complexity score associated with audio content of at least a portion of a media asset may be calculated or determined using the following mathematical relationship:

$$\text{Complexity score}_{\text{associated with audio content of at least a portion of a media asset}} = \sum_{i=t_1}^{t_n} f_i \times \text{volume}(t) + \sum_{i=t_1}^{t_n} g_i \times \text{frequency}(t) + \sum_{i=t_1}^{t_n} h_i \times \text{number of number of sound sources}(t) + \sum_{i=t_1}^{t_n} i_i \times \text{audio velocity}(t) + \sum_{i=t_1}^{t_n} j_i \times \text{audio volatility}(t)$$

wherein the complexity score associated with the audio content of the at least a portion of the media asset, the volume, the frequency, the number of sound sources, the audio velocity and the audio volatility are all functions of time (e.g., runtime of the at least a portion of the media asset) and each of the volume, the frequency, the number of sound sources, the audio velocity and the audio volatility is assigned a respective weight (e.g., $f_i$, $g_i$, $h_i$, $i_i$, or $j_i$). In some instances, each weight of weights $f_i$, $g_i$, $h_i$, $i_i$ and $j_i$ is time-dependent: the respective value associated with each weight is a function of time. In some instances, each weight of weights $f_i$, $g_i$, $h_i$, $i_i$ and $j_i$ is time-independent: the value of each weight is not a function of time, and each weight may have a respective constant value irrespective of the time. Each time of times $t_1$ to $t_n$ represents a time at which a respective frame is located in a presentation sequence associated with the at least a portion of the media asset.

In some instances, the complexity score associated with audio and visual content of at least a portion of a media asset may be calculated or determined using the following mathematical relationship:

$$\text{Complexity score}_{\text{associated with at least a portion of the media asset}} = A \times \text{Complexity core}_{\text{associated with visual content of the at least a portion of the media asset}} + B \times \text{Complexity score}_{\text{associated with audio content of the at least a portion of the media asset}}$$

wherein coefficients A and B are two weights related to the complexity score associated with the visual content of the at least a portion of the media asset and complexity score associated with the audio content of the at least a portion of the media asset, respectively. In some instances, coefficient A is greater than coefficient B, for example, when the at least a portion of the media asset does not comprise any speech but only music or is even silent. In some instances, coefficient A is equal to coefficient B. In some instances, coefficient A is lower than coefficient B, for example, when the at least a portion of the media asset comprises monochromatic frames.

In some instances, a complexity score associated with language content information of at least a portion of a media asset is based on closed captions, wherein the closed captions comprise similar words transcribed from the speech and additional words related to the context of scenes of the at least one portion of the media asset):

$$\text{Complexity score}_{\text{associated with language content of at least a portion of a media asset}} = \sum_{i=t_1}^{t_n} k_i \times \text{closed captions}(t)$$

wherein the complexity score associated with the language content information of the at least a portion of the media asset and the closed captions are functions of time (e.g., runtime of the at least a portion of the media asset), and the closed captions are assigned a respective weight $k_i$. In some instances, the weight $k_i$ is time-dependent: the respective value associated with the weight $k_i$ is a function of time. In some instances, weight $k_i$ is time-independent: the value of the weight $k_i$ is not a function of time, and each weight may have a respective constant value irrespective of the time. Each time of times $t_1$ to $t_n$ represents a time at which a respective frame is located in a presentation sequence associated with the at least a portion of the media asset.

In some instances, the complexity score associated with language content information of a portion of a media asset obeys the following mathematical relationship:

$$\text{complexity score}_{\text{associated with language content of at least a portion of a media asset}} = \sum_{i=t_1}^{t_n} l_i \times \text{speech}(t)$$

wherein the complexity score associated with the language content information of the at least a portion of the media asset and the speech are functions of time (e.g., runtime of the at least a portion of the media asset), and the speech is assigned a respective weight $l_i$. In some instances, the weight $k_i$ is time-dependent: the respective value associated with the weight $l_i$ is a function of time. In some instances, weight $k_i$ is time-independent: the value of the weight $k_i$ is not a function of time, and each weight may have a respective constant value irrespective of the time. Each time of times $t_1$ to $t_n$ represents a time at which a respective frame is located in a presentation sequence associated with the at least a portion of the media asset.

In some instances, the complexity score associated with at least a portion of the media asset is based on an amount of data (e.g., expressed in bytes) corresponding to an amount of content information (e.g., audio and/or visual content information, language content information) associated with the at least a portion of the media asset. In some instances, the complexity score associated with at least a portion of the media asset is based on an amount of encoded data (e.g., expressed in bytes) associated with the amount of data corresponding to the content information (e.g., audio and/or visual content information, language content information) associated with the at least a portion of the content item.

In some instances, a complexity score is associated with a portion of one or more media assets. To do so, the mathematical formula established above may be used, for each media asset of the one or more media assets, to determine the complexity score associated with a portion of a media asset. Each complexity score associated with a portion of a media asset of the one or more media assets may be then summed, combined, or otherwise considered to determine the complexity score associated with a portion of the one or more media assets (e.g., aggregated complexity score). In some instances, the aggregated complexity score may be a weighted sum of complexity scores of the one or more media assets.

In some instances, a user not only consciously consumes a media asset so as to comprehend the media asset, but also enters one or more user interface inputs (e.g., vocal and/or tactile) so as to interact with the media asset. The media asset may be, for example, a video game and the user may control, via user interface inputs, the whereabouts and the field of view of a character. The user's activity (e.g., entering user interface inputs) uses part of the user's maximum complexity load. A user activity score may be determined. Accordingly, when a content item (e.g., a video game) and a supplemental content item (e.g., an advertisement) are generated for simultaneous output, a weighted sum of the first complexity score (associated with the content item), the second complexity score (associated with the supplemental content item) and the user activity score may be determined. The weighted sum may be then compared to a threshold complexity score corresponding to the user's maximum complexity load. If the weighted sum is below the threshold complexity score, then the content item and the supplemental content item are generated for simultaneous output. If the weighted sum is above the threshold complexity score, then one or none of the content item and the supplemental content item is generated for output.

As referred to herein, the term “threshold complexity score” of at least a portion of a media asset comprises a maximum amount of content information (e.g., audio and/or visual content information, language content information) associated with at least a portion of a media asset a user could assimilate. Alternatively, the term “threshold complexity score” of the at least a portion of the media asset comprises a maximum amount of data, corresponding to the maximum amount of content information (e.g., audio and/or visual content information, language content information) associated with the at least a portion of the media asset, the user could assimilate. Alternatively, the term “threshold complexity score” of the at least a portion of the media asset comprises a maximum amount of encoded data, corresponding to the maximum amount of data corresponding to the maximum amount of content information (e.g., audio and/or visual content information, language content information) associated with the at least a portion of the media asset, the user could assimilate.

In some instances, the threshold complexity score comprises a threshold complexity score associated with visual content information of one or more media assets and a threshold complexity score associated with audio content information of the one or more media assets. Language content information of the one or more media assets may be a portion of the visual content information of the one or more media assets (if using the closed captions) or a portion of the audio content of the one or more media assets (if using the transcribed speech). In some instances, the threshold complexity score comprises a threshold complexity score associated with visual content information of one or more media assets, a threshold complexity score associated with audio content information of the one or more media assets and a threshold complexity score associated with language content information of the one or more media assets (the language content information being based on at least one of the closed captions or transcribed speech).

Figure 2:
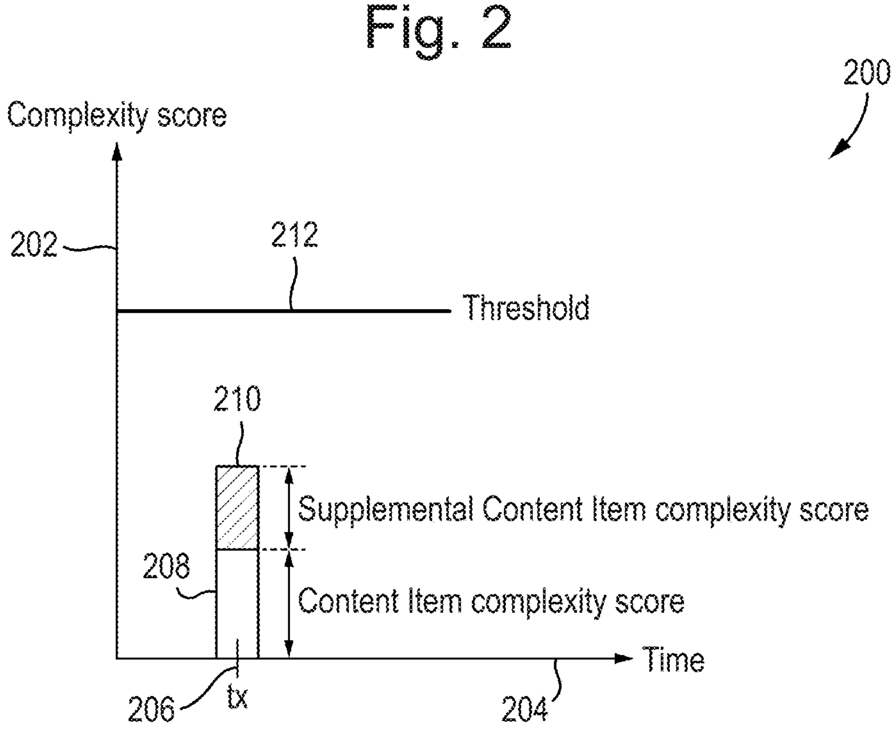
FIG. 2 illustrates an example for enabling the improved output of multiple content items, in accordance with some implementations of the disclosure.
Figure 3:
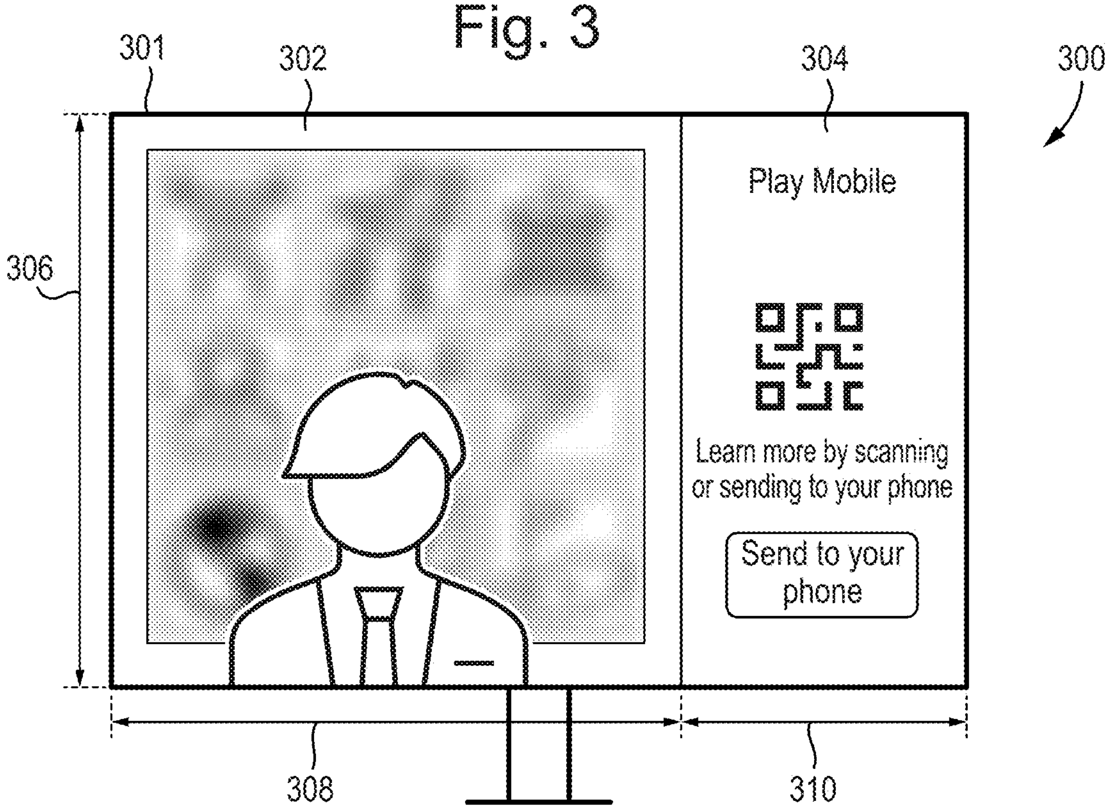
FIG. 3 depicts an example for enabling the improved output of multiple content items, in accordance with some implementations of the disclosure.

FIG. 1 represents an example 100 for enabling the improved output of multiple content items, in accordance with some implementations of the disclosure. Example 100 depicts a television 101 (e.g., smart TV) comprising a display split into a first display portion 102 and a second display portion 104 presenting a content item (e.g., news in which an anchor reads the news in front of a blurred background depicting several blurred images) and a supplemental content item (e.g., a commercial for a mobile telephone company), respectively. The first complexity score associated with the content item relies mostly on the anchor's speech as the anchor is mostly still and the background is blurred. In the commercial promoting at least one product or service provided by the mobile telephone company, a superhero evolves in a succession of decors while performing specific tasks: the second complexity score associated with the supplemental content item is higher than a commercial consisting of presenting a QR code (as shown in FIGS. 2 and 3). Television 101 is in communication with a server (e.g., a local server or a remote server), via a communication network (e.g., LAN or WAN), whose bandwidth may fluctuate over time. A user watches display 101 and at certain times, simultaneously consumes frames of the content item (presented on first display portion 102) and the supplemental content item (presented on second display portion 104). At other times, the user consumes only frames of the content item presented on first display portion 102, or on the area of display 101 comprising first display portion 102 and second display portion 104. First display portion 102 has a size defined by a height 106 and a width 108, while second display portion 104 has a size defined by height 106 and a width 110.

In some instances, the size of first display portion 102 is based on a first complexity score (e.g., first complexity score 208 of FIG. 2) associated with the content item. For example, the size of first display portion 102 is proportional to the first complexity score. The higher the first complexity score, the larger the size of first display portion 102. In some instances, the size of second display portion 104 is based on a second complexity score (e.g., second complexity score 210) associated with the supplemental content item. For example, the size of second display portion 104 is proportional to the second complexity score. The higher the second complexity score, the larger the size of first display portion 102. In some instances, the size of first display portion 102 and size of second display portion 104 are interrelated. For example, the size of first display portion 102 is proportional to a ratio of the first complexity score to the second complexity score, and the size of second display portion 104 is proportional to a ratio of the second complexity score to the first complexity score. Enlarging the size of display portion based e.g., on a specific complexity score or a complexity score-related ratio allows for enlarging details of the media-asset frame presented via the display portion and thus helping the assimilation, by the user, of the media asset (e.g., content item or supplemental content item). In some instances, a device (e.g., television 101 or a server) associates the supplemental content item with a plurality of portions of the content item to be generated for simultaneous output when a sum of the first complexity score associated with the portions of the content item and the second complexity score associated with the supplemental content item is below a threshold complexity score (e.g., threshold complexity score 212 of FIG. 2). Hereby, the user is able to consciously consume both media assets. To do so, the device determines the first complexity score, the second complexity score and the threshold complexity score.

FIG. 2 illustrates an example 200 for enabling the improved output of multiple content items, in accordance with some implementations of the disclosure. FIG. 2 depicts, in a coordinate system whose abscissa axis 204 and ordinate axis 202 represent times and complexity scores, respectively, a histogram representing a sum, for a time $t_x$ 206, of a first complexity score 208 associated with a content item and a second complexity score 210 associated with a supplemental content item, the sum being lower than a threshold complexity score 212. In some instances, time $t_x$ 206 is a specific time unit in a timeline at which a first frame of the content item and a second frame of the supplemental content item are simultaneously output: first complexity score 208 and second complexity score 210 are associated with the first frame of the content item and the second frame of the supplemental content item, respectively, while threshold complexity score 212 takes into account (or not) the fact that at time $t_x$ 206, a frame from each of the content item and supplemental content item is generated for output. In some instances, time $t_x$ 206 is a sum of consecutive specific time units in a timeline, during which, at each consecutive specific time unit of time $t_x$ 206, a frame of the first plurality of frames of the content item and a frame of the second plurality of frames are simultaneously output: first complexity score 208 and second complexity score 210 are associated with the first plurality of frames of the content item and the second plurality of frames of the supplemental content item, respectively, while threshold complexity score 212 takes into account (or not) the fact that, at each consecutive time unit of time $t_x$ 206, a frame from each of the content item and supplemental content item is generated for output.

In some instances, during or at time $t_x$ 206, the content item is the only media asset generated for output: threshold complexity score 212 is at a first value that is constant or not. In some instances, during or at time $t_x$ 206, the content item and supplemental content are generated for simultaneous output: threshold complexity score 212 is at a second value that is constant or not. In some instances, the second value is equal to the first value. In some instances, the second value is different from the first value. In some instances, threshold complexity score 212 is based at least in part on the communication network bandwidth (e.g., current or predicted bandwidth). In some instances, threshold complexity score is equal to a percentage of the communication network bandwidth (e.g., current or predicted bandwidth).

FIG. 3 depicts an example 300 for enabling the improved output of multiple content items, in accordance with some implementations of the disclosure. Example 300 depicts a television 301 (e.g., smart TV) comprising a display split into a first display portion 302 and a second display portion 304 presenting a content item (e.g., news in which an anchor reads the news in front of a blurred background depicting several blurred images) and a supplemental content item (e.g., a commercial for a mobile telephone company), respectively. The first complexity score associated with the content item relies mostly on the anchor's speech as the anchor is mostly still and the background is blurred. In the commercial promoting at least one product or service provided by the mobile telephone company, a QR code is presented along with a message: the second complexity score associated with the supplemental content item is low. Television 301 is in communication with a server (e.g., a local server or a remote server), via a communication network (e.g., LAN or WAN), whose bandwidth may fluctuate over time. A user watches display 301 and at certain times, simultaneously consume frames of the content item presented on first display portion 302 and supplemental content item presented on second display portion 304. At other times, the user consumes only frames of the content item presented on first display portion 302, or on the area of display 301 comprising first display portion 302 and second display portion 304. A QR code is an arrangement of pixels of two different colors, each positioned at a given location in a square area. Additionally, the user is not to assimilate the QR code but simply recognizes the presence of the QR code so as to use a scanner from their mobile phone or press a key labeled "Send to your phone", in order to access a website related to at least one product or service promoted by the mobile telephone company. QR codes are thus associated with low-complexity scores. The supplemental content item comprises a plurality of identical frames, wherein each frame depicts, e.g., a same QR code: the second complexity score associated with the supplemental content item is thus low. First display portion 302 has a size defined by a height 306 and a width 308, while second display portion 304 has a size defined by height 306 and a width 310. In some instances, the size of first display portion 302 is based on a first complexity score (e.g., first complexity score 208 of FIG. 2) associated with the content item. For example, the size of first display portion 302 is proportional to the first complexity score. The higher the first complexity score, the higher the size of first display portion 302. In some instances, the size of second display portion 304 is based on a second complexity score (e.g., second complexity score 210 of FIG. 2) associated with the supplemental content item. For example, the size of second display portion 304 is proportional to the second complexity score. The higher the second complexity score, the larger the size of second display portion 304. In some instances, the size of first display portion 302 and size of second display portion 304 are interrelated. For example, the size of first display portion 302 is proportional to a ratio of the first complexity score to the second complexity score, and the size of second display portion 304 is proportional to a ratio of the second complexity score to the first complexity score. Enlarging the size of display portion based, e.g., on a specific complexity score or a complexity score-related ratio allows for enlarging details of the media-asset frame presented via the display portion and thus helping the assimilation, by the user, of the media asset (e.g., content item or supplemental content item). In some instances, a device (e.g., server or computing device such as television 301) associates the supplemental content item with a plurality of portions of the content item to be generated for simultaneous output when a sum of the first complexity score associated with the portions of the content item and the second complexity score associated with the supplemental content item is below a threshold complexity score (e.g., threshold complexity score 212 of FIG. 2). Hereby, the user is able to consciously consume both media assets. To do so, the device determines the first complexity score, the second complexity score and the threshold complexity score.

Figure 4:
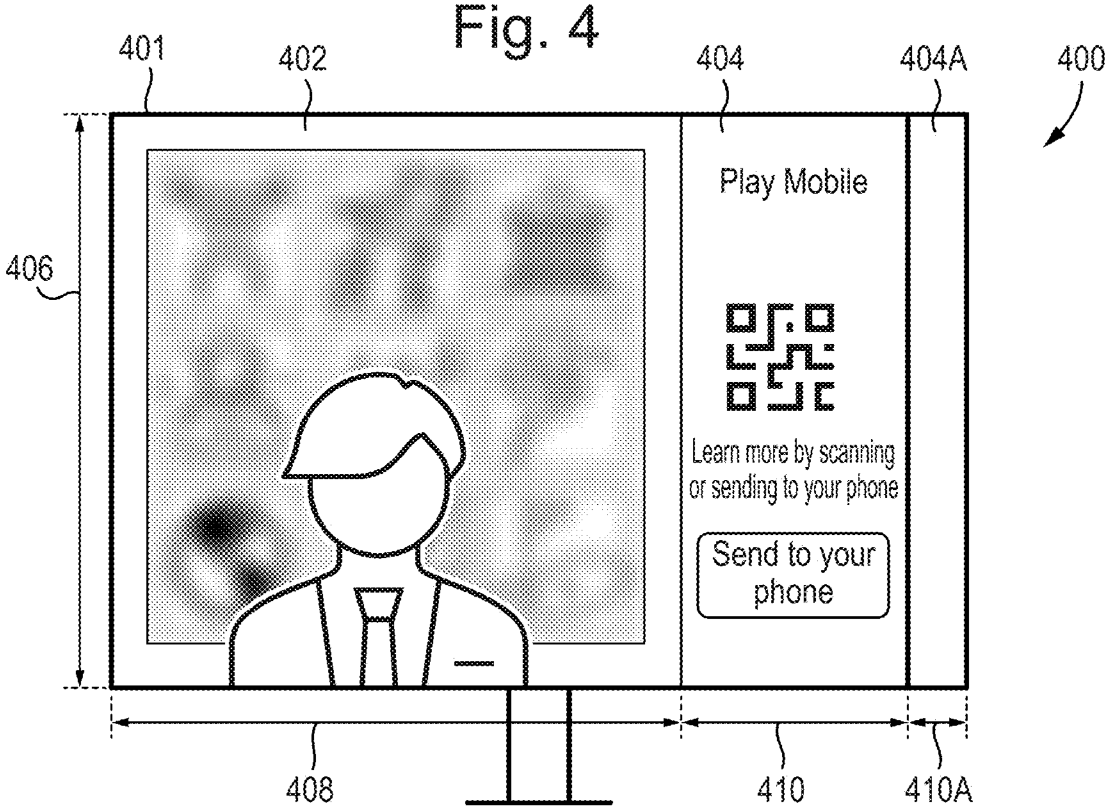
FIG. 4 shows an example for enabling the improved output of multiple content items, in accordance with some implementations of the disclosure.

FIG. 4 shows an example 400 for enabling the improved output of multiple content items, in accordance with some implementations of the disclosure. Example 400 depicts a television 401 (e.g., smart TV) comprising a display split into a first display portion 402 and a second display portion 404 presenting a content item (e.g., news in which an anchor reads the news in front of a blurred background depicting several blurred images) and a supplemental content item (e.g., a commercial for a mobile telephone company), respectively. The first complexity score associated with the content item relies mostly on the anchor's speech as the anchor is mostly still and the background is blurred. In the commercial promoting at least one product or service provided by the mobile telephone company, a QR code is presented along with a message: the second complexity score associated with the supplemental content item is low. Television 401 is in communication with a server (e.g., a local server or a remote server), via a communication network (e.g., LAN or WAN), whose bandwidth may fluctuate over time. A user watches display 401 and at certain times, simultaneously consumes frames of the content item presented on first display portion 402 and the supplemental content item presented on second display portion 404. At other times, the user consumes only frames of the content item presented on first display portion 402, or on the area of display 401 comprising first display portion 402 and second display portion 404. A QR code is an arrangement of pixels of two different colors, each positioned at a given location in a square area. Additionally, the user is not to assimilate the QR code but simply recognizes the presence of the QR code so as to use a scanner from their mobile phone or press a key, labeled "Send to your phone", in order to access a website related to at least one product or service promoted by the mobile telephone company. QR codes are thus associated with low-complexity scores. The supplemental content item comprises a plurality of identical frames, wherein each frame depicts, e.g., a same QR code: the second complexity score associated with the supplemental content item is low. First display portion 402 has a size defined by a height 406 and a width 408, while second display portion 404 has a size defined by height 406 and a width 410. In some instances, the size of first display portion 402, on which the content item is presented, is constant throughout the presentation of the content item so as to not cause any discomfort to the user. In some instances, the size of second display portion 404 is based on a second complexity score (e.g., second complexity score 210 of FIG. 2) associated with the supplemental content item. For example, the size of first display portion 402 is proportional to the second complexity score. The higher the second complexity score, the larger the size of second display portion 404. The size of second display portion 404 can reach at maximum the size corresponding to the difference between the size of display 401 and the size of first display portion 402. In some instances, the second complexity score is not high enough to occupy the size corresponding to the difference between the size of display 401 and the size of first display portion 402. In some instances, portion 404A is minimized to fully use display 401. Enlarging the size of display portion based, for example, on a specific complexity score or a complexity score-related ratio allows for enlarging details of the media-asset frame presented via the display portion and thus helping the assimilation, by the user, of the media asset (e.g., content item or supplemental content item). In some instances, a device (e.g., server or computing device such as television 401) associates the supplemental content item with a plurality of portions of the content item to be generated for simultaneous output when a sum of the first complexity score associated with the portions of the content item and the second complexity score associated with the supplemental content item is below a threshold complexity score (e.g., threshold complexity score 212 of FIG. 2). Hereby, the user is able to consciously consume both media assets. To do so, the device determines the first complexity score, the second complexity score and the threshold complexity score.

Figure 5:
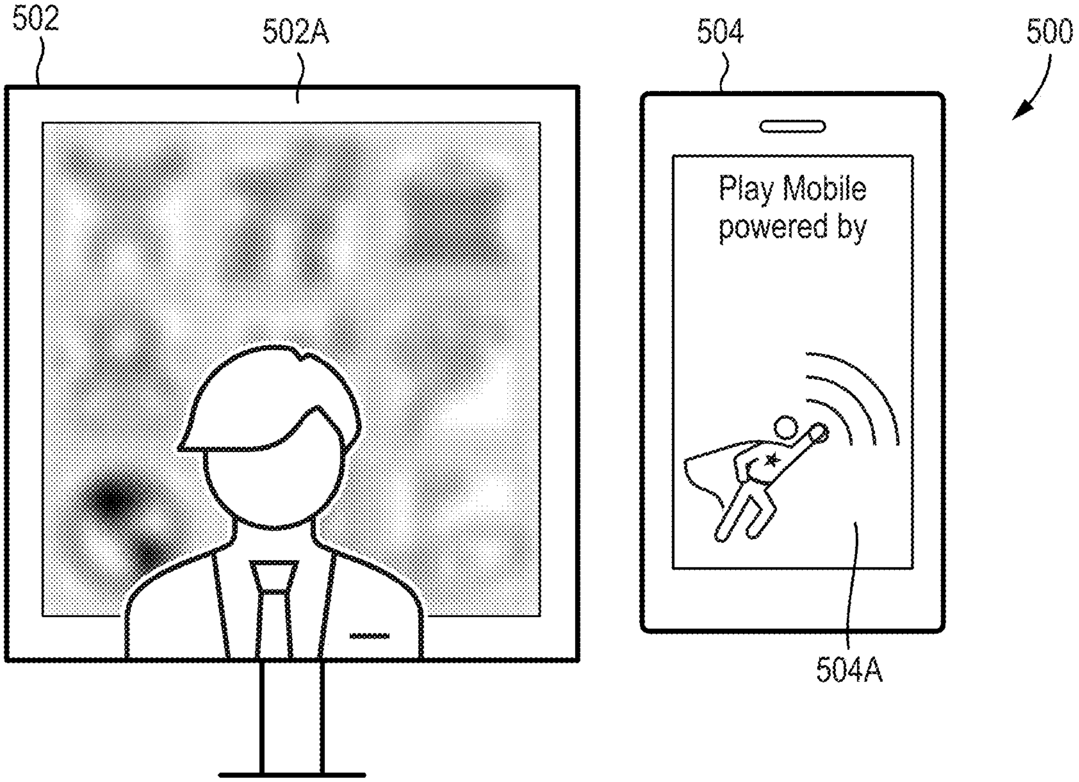
FIG. 5 represents an example for enabling the improved output of multiple content items, in accordance with some implementations of the disclosure.

FIG. 5 represents an example 500 for enabling the improved output of multiple content items, in accordance with some implementations of the disclosure. Example 500 depicts a television 502 (e.g., smart TV) comprising a first display 502A presenting a content item (e.g., news in which an anchor reads the news in front of a blurred background depicting several blurred images) and a telephone 504 e.g., mobile phone comprising second display 504A presenting a supplemental content item (e.g., a commercial for a mobile telephone company). The first complexity score associated with the content item relies mostly on the anchor's speech as the anchor is mostly still and the background is blurred. In the commercial promoting at least one product or service provided by the mobile telephone company, a superhero evolves in a succession of decors while performing specific tasks: the second complexity score associated with the supplemental content item is higher than a commercial consisting of presenting a QR code (as shown on FIGS. 3 and 4). Television 502 and telephone 504 are in communication with a server (e.g., a local server or a remote server), via a communication network (e.g., LAN or WAN), whose bandwidth may fluctuate over time. A user watches first display 502A to consume the content item and may, at certain times, watch second display 504A to consume the supplemental content item. In some instances, first display 502A and second display 504A are located in a same field of view of the user: both content item and supplemental content item are generated for simultaneous presentation to the user who consumes both media assets. In some instances, first display 502A and second display 504A are located in different fields of view of the user: both content item and supplemental content item are generated for simultaneous presentation to the user who consumes only one of the content item and supplemental content item at a time (if not simultaneously located in the user's field of view), and alternates between the two. The content item is presented on the entire first display 502A, while the supplemental content item is presented on the entire second display 504. In some instances, a device (e.g., server or device comprising television 502 and telephone 504) associates the supplemental content item with a plurality of portions of the content item to be generated for simultaneous output when a sum of the first complexity score associated with the portions of the content item and the second complexity score associated with the supplemental content item is below a threshold complexity score (e.g., threshold complexity score 212 of FIG. 2). Hereby, the user is able to consciously consume both media assets. To do so, the device determines the first complexity score, the second complexity score and the threshold complexity score. In some instances, a device (e.g., server or device comprising television 502 and telephone 504) associates the supplemental content item with a plurality of portions of the content to be generated for simultaneous output when a sum of the first complexity score (associated with the portions of the content item), the second complexity score (associated with the supplemental content item) and a user activity score is below a threshold complexity score (e.g., threshold complexity score 212 of FIG. 2). To do so, the device determines the first complexity score, the second complexity score, the threshold complexity score and the user activity score. The user activity score is based on the user interface inputs the user enters to interact with at least one of the content item or the supplemental content item.

In some instances, in FIG. 5, the user may cast, on television 502, the supplemental content item they were consuming on telephone 504, and split first display 502A so as to present both the content item and the supplemental content item on first display 502A. Hereby, the user can simultaneously and consciously consume both media assets.

In some instances, two or more media assets may be generated for simultaneous output on a display device so as to be simultaneously presented on the display device. The display device may be a split screen, wherein each media asset is presented on a portion of the split screen. For each media asset, a device (e.g., a server, or a computing device such as a display device) may determine, prior to the presentation of a portion of the media asset, a complexity score associated with the portion of the media asset. The determination of the complexity score may be performed, in advance of a user's request of the media asset or after a request, by the display device, of the portion of the media asset.

If, for each media asset, the device has access to the time-dependent plot of the complexity score associated with the media asset, the device may search for the portions of the media asset exhibiting the lowest or relatively low complexity score. The device, then, may select, for each media asset, a respective time at which the media asset starts being presented from a respective portion of the media asset (e.g., start portion of the media asset, end portion of the media asset or intermediate portion of the media asset between the start portion and the end portion). The two or more media assets may start being presented at the same time or at different times. Alternatively, some of the two or more media assets may start being presented at the same time and some others of the two or more media assets may be presented at different times. The device may thus control the aggregated complexity score resulting from a combination of the complexity scores of the two or more media assets, when the two or more media assets are presented. In some instances, the device may synchronize portions of the two or more media assets, each exhibiting the lowest or relatively low complexity score, so as to have periods of time where the aggregated complexity score is low. The device may then generate for simultaneous output along with the two or more media assets, a supplemental content item (e.g., an advertisement) that is suitable in view of the aggregated complexity score and the threshold complexity score corresponding to the user's maximum complexity load. The aggregated complexity score associated with the two or more media assets and the supplemental content item should be below the threshold complexity score. In some instances, the supplemental content item may be presented in a picture-in-picture (PIP) window superimposed on one or more parts of the two or more display portions assigned to the two or more media assets. The one or more parts of the two or more display portions may present, for instance, unimportant elements of the two or more media assets. Alternatively, the supplemental content item may be presented on a display portion generated by re-sizing the two or more display portions already present.

In some instances, the device may assign, to each media asset, a respective display portion based on the complexity score associated with the media asset: the larger the complexity score, the larger the display portion. The aggregated complexity score may take into account the fact that a larger display portion allows for making more details of a media asset perceptible to the user, which may increase the complexity score associated with the media asset. In some instances, the aggregated complexity score may comprise a weighted sum (or other combinations) of the complexity scores of the two or more media assets, wherein a respective weight is assigned to each of the two or more media assets. The larger the respective display portion, the larger the weight.

If, for each media asset, the device determines, in real time, the time-dependent plot of the complexity score associated with the media asset, the device may expand the storage capacity of a memory to save a larger amount of portions of the media asset and determines, ahead of the presentation of the media asset, large chunks of the time-dependent plot of the complexity score associated with the media asset. The device may search, within said chunks, for the portions of the media asset exhibiting the lowest or relatively low complexity score, by comparing a newly-determined chunk of said chunks with formerly-determined chunks of said chunks. Alternatively, the device may predict the location of the portions of the media asset exhibiting the lowest or relatively low complexity score. For instance, the device may analyze the determined part of the time-dependent plot of the complexity score associated with the media asset and establish a monotonic trend of the plot for a period of time based on other media assets related to the media asset in terms of content. The device may further implement the following steps: determination of the aggregated complexity score associated with the two or more media assets, determination of a suitable supplemental content item (e.g., advertisement) based on the aggregated complexity score and a threshold complexity score, simultaneous output along with the two or more media assets on a PIP or a display portion resulting from the re-sizing of the two or more display portions on which the two or more media assets are presented.

Figure 6:
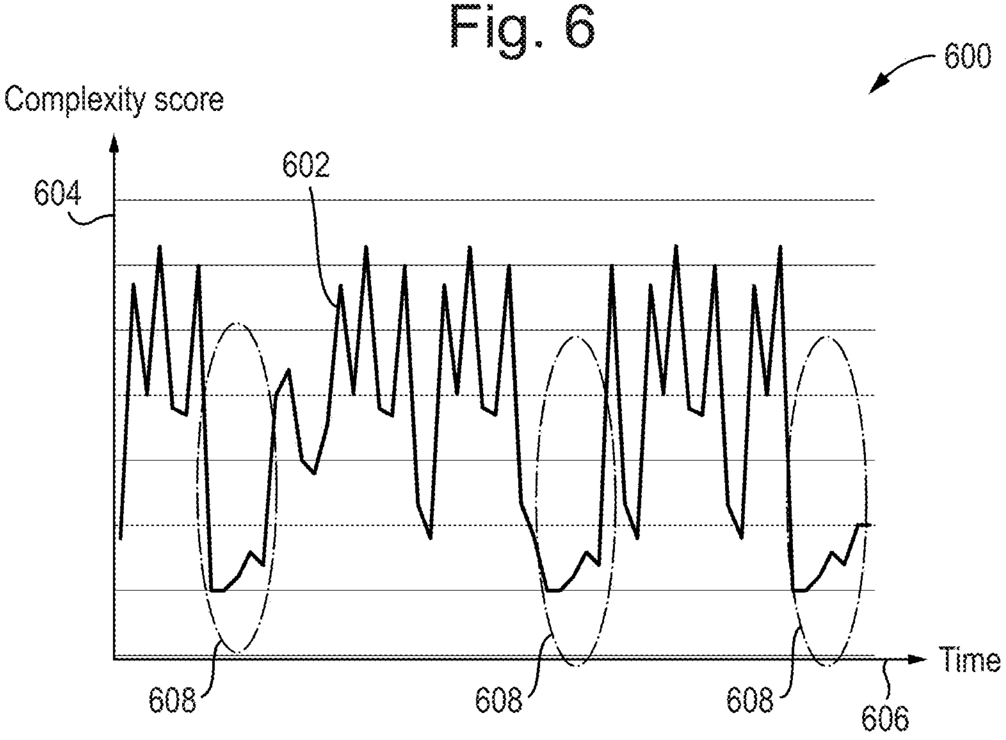
FIG. 6 illustrates an example for enabling the improved output of multiple content items, in accordance with some implementations of the disclosure.

FIG. 6 illustrates an example 600 for enabling the improved output of multiple content items, in accordance with some implementations of the disclosure. Example 600 depicts, in a coordinate system (whose ordinate axis 604 and abscissa axis 606 indicate a complexity score and time, respectively), a curve or plot 602 representing a first complexity score associated with a content item against a runtime of the content item. Each circled zone 608 indicates a plurality of portions of the content item exhibiting a minimum or relatively low first complexity score, during which a supplemental content item exhibiting a second complexity score could be selectively generated for simultaneous output with the plurality of portions of the content item. In effect, the probability for a sum of the first complexity score associated with the plurality of portions of the content item and second complexity score associated with the supplemental content item to be lower than a threshold complexity score increases when the first complexity score is a minimum first complexity score. In some instances, a device (e.g., a server or a computing device) analyzes curve 602, determines zone(s) 608 to generate for simultaneous output the supplemental content item (along with the content item). In some instances, the device determines the supplemental content item for simultaneous output (along with a plurality of portions of the content item) based on (1) the time window associated with the plurality of portions of the content item exhibiting a minimum or relatively low first complexity score, (2) the second complexity score associated with the supplemental content item, (3) the minimum or relatively low first complexity score associated with the plurality of portions of the content item and (4) the threshold complexity score (e.g., which is user-dependent or user category-dependent). In some instances, the device is a server that performs a supplemental content item insertion (e.g., server-side or server-guided ad insertion). In some instances, the device performs a computing device-side supplemental content item insertion (e.g., computing device- or client-side ad insertion). As mentioned earlier, the numberings in parentheticals (e.g., (1), (2), (3), etc.) as used herein and also hereinafter, are for identifying relevant or related examples, or aspects, and is not intended to be limiting or to specify a particular order, sequence, or quantity.

In some instances, a device (e.g., a server or a computing device) analyzes a plurality of viewing histories, each viewing history being associated with a respective user having watched the content item, and determines, for each viewing history, one or more consecutive frames of the content item at which an engagement of the respective user has decreased by identifying whether the respective user has, e.g., paused, rewound, forwarded, or switched content. The one or more consecutive frames of the content item (corresponding to a plurality of portions of the content item) also represent places suited for generating for simultaneous output a supplemental content item (along with the plurality of portions of the content item).

In some instances, a device (e.g., a server or a computing device) identifies a set of plurality of portions of a content item exhibiting the lowest first complexity scores by accessing available data (e.g., at least one of segment sizes, group of pictures, or size of I-frames, with or without standard deviations thereof) generated after segmenting and encoding the content item, using a variable bitrate encoder. The lower the amount of content information (e.g., audio and/or visual content information, language content information) associated with a plurality of portions of the content item, the lower the amount of data corresponding to the content information associated with the plurality of portions of the content item, the lower the amount of encoded data corresponding to said data, the lower the first complexity score. The set of pluralities of portions of the content item exhibiting the lowest or relatively low first complexity scores thus comprises each plurality of portions exhibiting the lowest amounts of encoded data. In some instances, the device (e.g., server or computing device) excludes, from the set of pluralities of portions of the content item exhibiting the lowest or relatively low first complexity scores, any plurality comprising one or more highlights (e.g., current or predicted highlights) of the content item in order to avoid distracting a user with a supplemental content item (e.g., advertisement).

In some instances, a size of a first display portion on which the content item is to be presented is decreased at the benefit of a size of a second display portion on which the supplemental content item (e.g., an advertisement) is to be presented when the supplemental content item is generated for simultaneous output with the content item. In such examples, the size of the first display portion and size of the second display portion are not correlated with a first complexity score associated with a plurality of portions of the content item (or the content item) and a second complexity score associated with the supplemental content item, respectively. This results in promoting, to the user, the supplemental content item to the detriment of the content item. Resolution of the content item is scaled down to be proportional to the decreased size of the first display portion. In some instances, the size of the first display portion on which the content item is to be presented is proportional to the ratio of the first complexity score to the second complexity score (associated with the supplemental content item); and the size of the second display portion on which the supplemental content item is to be presented is proportional to the ratio of the second complexity score to the first complexity score. Resolution of the content item is either scaled down to be proportional to the decreased size of the first display portion or scaled up to be proportional to the increased size of the first display portion. In some instances, the device (e.g., server) indicates, in an adaptive bitrate streaming manifest of the content item, for each segment of the content item at any available bitrate and any available resolution, first complexity score associated with each segment of the content item. Based on the re-sizing of the first and second display portions, the device delivers, to another device (e.g., a computing device such as a client device), a segment of the content item based on the resolution (e.g., based on the number of pixels per width and height of a frame) so as to match the decreased or increased size of the first display portion.

Figure 7:
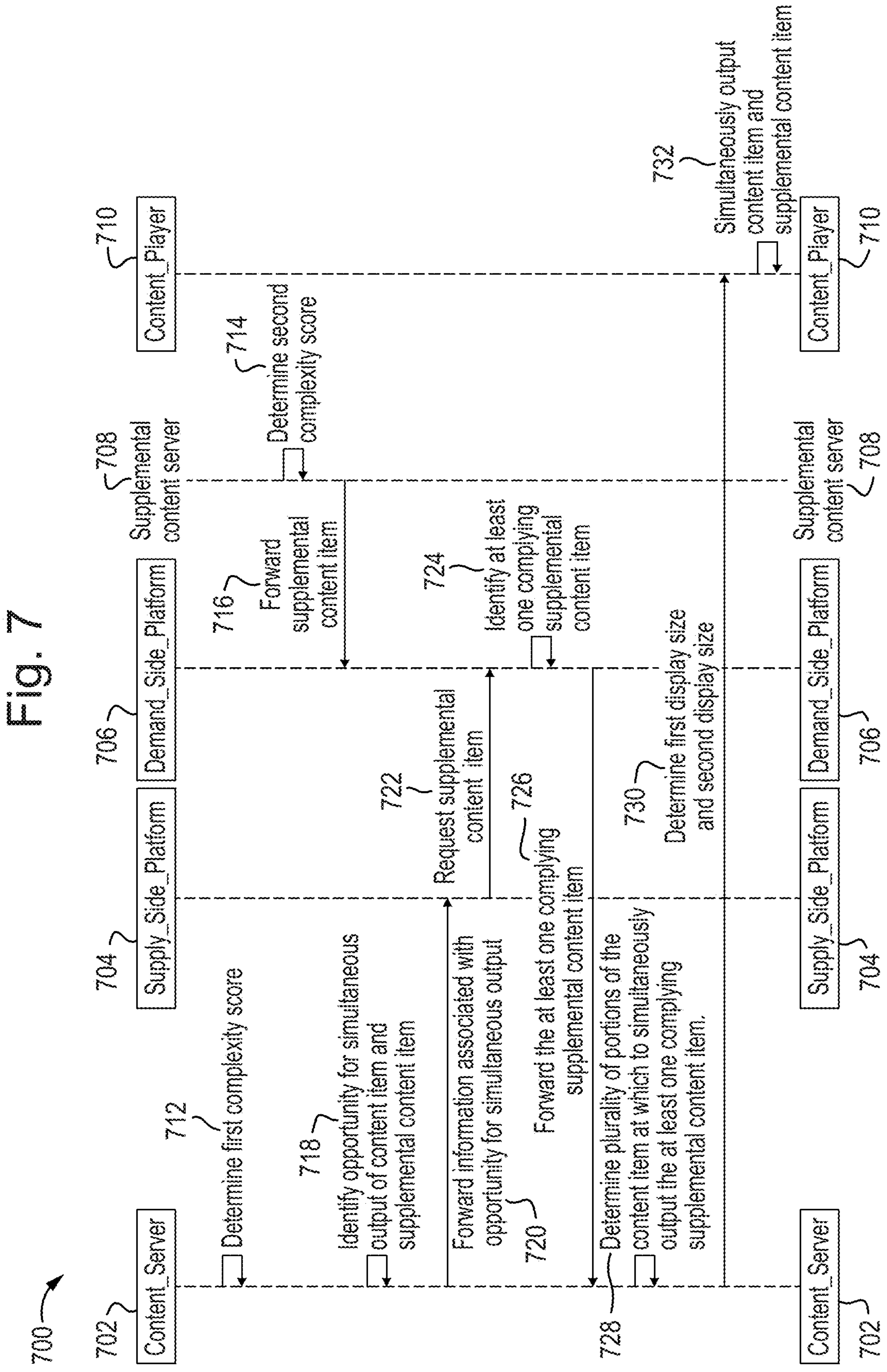
FIG. 7 depicts a flow diagram of illustrative steps involved in enabling the improved output of multiple content items, in accordance with some implementations of the disclosure.

FIG. 7 depicts a flow diagram of illustrative steps involved in enabling the improved output of multiple content items, in accordance with some implementations of the disclosure. Process 700 may be implemented, in whole or in part, on any of the disclosed devices. In addition, one or more actions of the process 700 may be incorporated into or combined with one or more actions of any other processes or embodiments described herein.

At step 712, a content server 702 determines a first complexity score associated with at least a portion of a content item (e.g., a movie, a documentary), e.g., based on (1) an amount of visual, audio and/or language content information associated with at least a portion of a content item, (2) an amount of data corresponding to the visual, audio and/or language content information associated with the at least a portion of the content item, (3) an amount of encoded data corresponding to the amount of data corresponding to the visual, audio and/or language content information associated with the at least a portion of the content item. In some instances, the content server 702 determines the first complexity score corresponding to each time unit of a runtime of the content item. In some instances, the content server 702 determines a first complexity score associated with at least a portion of one or more content items being presented on one or more display devices. In some instances, the content server 702 determines the first complexity score corresponding to each time unit of a runtime of the one or more content items.

At step 714, a supplemental content server 708 determines a second complexity score (e.g., based on an amount of visual, audio and/or language content information associated with a supplemental content item, an amount of data corresponding to the visual, audio and/or language content information associated with the supplemental content item, an amount of encoded data corresponding to the amount of data corresponding to the visual, audio and/or language content information associated with the supplemental content item) associated with a supplemental content item (e.g., advertisement). Both the first complexity score and second complexity score should be based on the same parameter type, e.g., (1) the amount of visual, audio and/or language content information, (2) the amount of data corresponding to the amount of visual, audio and/or language content information or (3) the amount of encoded data corresponding to the amount of data corresponding to the amount of visual, audio and/or language content information. In some instances, the supplemental content server 708 determines the second complexity score corresponding to each time unit of a runtime of the supplemental content item.

At step 716, the supplemental content server 708 delivers the supplemental content item to a demand-side platform 706.

At step 718, the content server 702 identifies one or more pluralities of portions of the content item, wherein the one or more pluralities of portions of the content item exhibit a minimum or relatively low first complexity score and corresponds to a candidate "place" to generate, for simultaneous output with the content item, the supplemental content item, since a sum of the first complexity score and second complexity score is more likely to be below a threshold complexity score at the one or more pluralities of portions of the content item than at any other plurality of portions of the content item (exhibiting a first complexity score above the minimum or relatively low first complexity score). The first complexity score, second complexity score and threshold complexity score may be based on the same parameter type e.g., (1) the amount of visual, audio and/or language content information, (2) the amount of data corresponding to the amount of visual, audio and/or language content information or (3) the amount of encoded data corresponding to the amount of data corresponding to the amount of visual, audio and/or language content information. In some instances, the content server 702 accesses a user profile associated with the user that is to consume the content item, wherein the user profile associated with the user comprises a threshold complexity score associated with the user. In some instances, the content server 702 determines a threshold complexity score associated with the user that is to consume the content item by subjecting the user to a questionnaire based on examples of simultaneous output of a plurality of portions of the content item and supplemental content item, wherein the responses to the questions of the questionnaire allow for determining whether the user was able to comprehend both media assets. In some instances, the content server 702 determines a threshold complexity score associated with the user that is to consume the content item by tracking, in real time, the user's activity during the simultaneous output of a plurality of portions of the content item and the supplemental content item. In some instances, the content server 702 determines a threshold complexity score associated with the user that is to consume the content item by identifying to which population the user belongs and by accessing the threshold complexity score associated with the identified population.

At step 720, the content server 702 delivers, to a supply-side platform 704, information (e.g., position, duration, first complexity score) associated with the one or more pluralities of portions of the content item exhibiting a minimum or relatively low first complexity score, and the threshold complexity score associated with the user (e.g., determined or accessed). The supply-side platform 704 determines, based on the delivered information, a supplemental content item. Characteristics (duration; second complexity score) of the supplemental content item may comply with the delivered information (e.g., position, duration, first complexity score) associated with at least one plurality of portions of the content item (of the one or more pluralities of portions of the content item exhibiting a minimum or relatively low first complexity score) and the delivered threshold complexity score associated with the user. In some instances, the sum of the first complexity score and second complexity score are below the threshold complexity score. In some instances, the duration of the supplemental content item is shorter than the duration of the at least one of the plurality of portions of the content item. In some instances, the duration of the supplemental content item is longer than the duration of the at least one of the plurality of portions of the content item.

At step 722, the supply-side platform 704 delivers, to a demand-side platform 706, a request for at least one supplemental content item whose characteristics (e.g., duration, second complexity score) comply with the delivered information (e.g., position, duration, first complexity score) associated with at least one plurality of portions of the content item (of the one or more pluralities of portions of the content item exhibiting a minimum or relatively low first complexity score) and the delivered threshold complexity score associated with the user.

At step 724, the demand-side platform 706 identifies at least one complying supplemental content item.

At step 726, the demand-side platform 706 sends the at least one complying supplemental content item to the content server 702.

At step 728, the content server 702 determines a plurality of portions of the content item of the first set of pluralities of portions of the content item at which to simultaneously output the at least one complying supplemental content.

At step 730, the content server 702 assigns, for output, the content item to a first display portion (e.g., first display portions 102, 302, or 402) and the at least one complying supplemental content item to a second display portion (e.g., second display portions 104, 304, or 404). In some instances, content server 702 assigns, for output, the content item to a first display (e.g., first display 502) and the at least one complying supplemental content item to a second display (e.g., second display 504). In some instances, the content server 702 determines the first display portion and second display portion relative to each other by (1) having the first display portion being proportional to a ratio of the first complexity score to the second complexity score and/or (2) having the second display portion being proportional to a ratio of the second complexity score to the first complexity score.

At step 732, the content server 702 sends the at least one complying supplemental content item to a content player 710 in order to simultaneously output the plurality of portions of the content item of the first set and the supplemental content item. In some instances, the content server 702 simultaneously outputs the content item and the supplemental content item such that the supplemental content item and a plurality of portions of the content item of the first set of pluralities of portions of the content item overlap.

In some instances, the supply-side platform 704 and the demand-side platform 706 are merged into a same platform implementing the steps of each of the supply-side platform 704 and the demand-side platform 706. In some instances, the content server 702 and the supplemental content server 708 are merged into a same server implementing steps of each of the content server 702 and the supplemental content server 708. In some instances, the content player 710 implements the steps implemented by the content server 702. In some instances, the content player 710 implements the steps implemented by each of the content server 702 and the supplemental content server 708.

In some instances, the computing device (e.g., one or more servers belonging to a CDN) determines, in real time, a complexity score associated with a plurality of portions of a media asset, e.g., live streamed, during a time gap between a capture, by a camera, of the plurality of portions of the media asset and the rendering, by a computing device, of the plurality of portions of the media asset. The computing device then requests, from a supply-side platform (e.g., supply-side platform 704) another media asset (e.g., a supplemental content item such as program commentary and/or an advertisement) exhibiting suitable characteristics (e.g., runtime, complexity score) in view of e.g., a length of the plurality of portions of the media asset and the complexity score associated with the plurality of portions of the media asset. Next, the computing device generates the other media asset for simultaneous output with the plurality of portions of the media asset.

Figure 8:
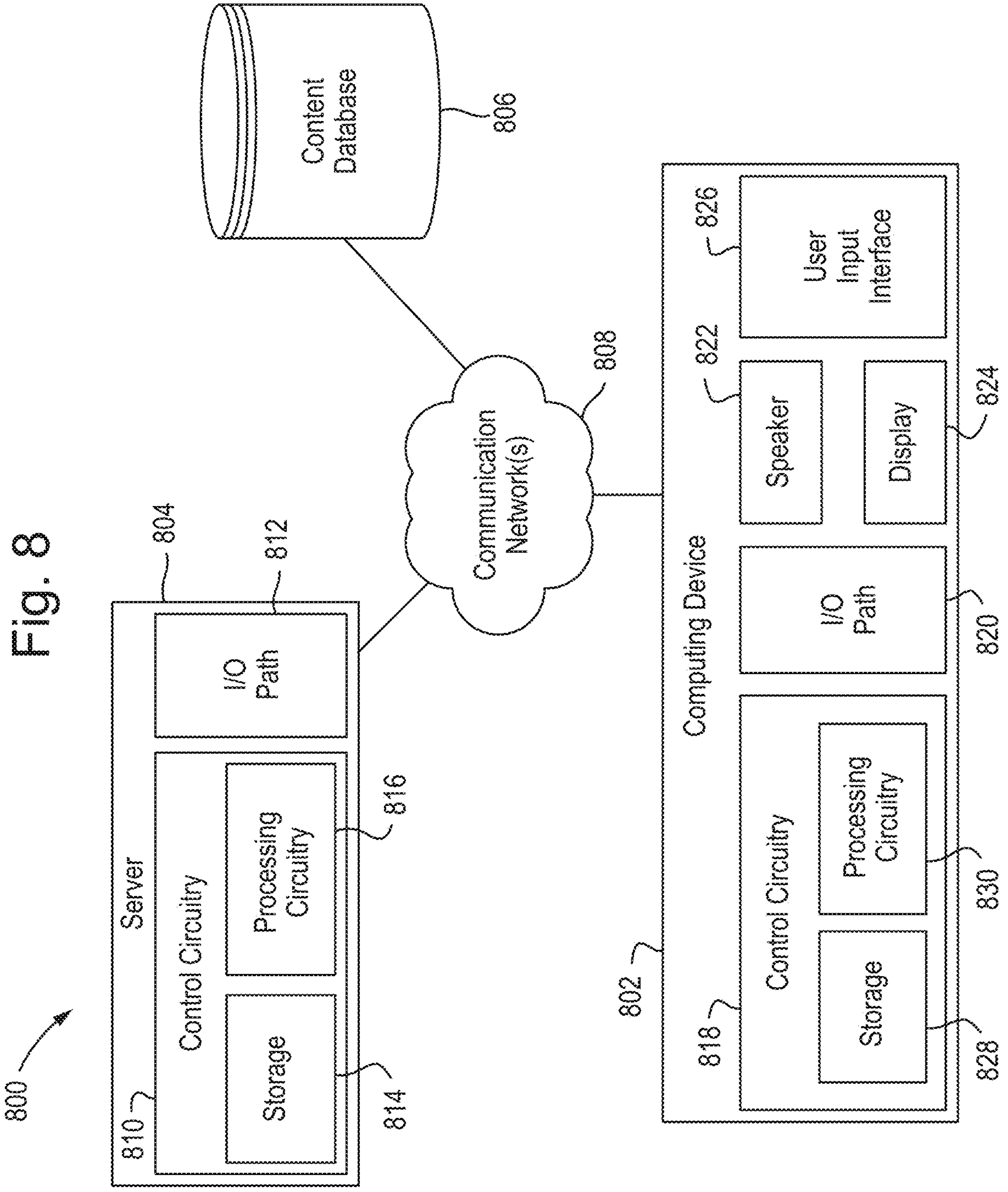
FIG. 8 shows a block diagram showing components of an example system for enabling the improved output of multiple content items, in accordance with some implementations of the disclosure.

FIG. 8 shows a block diagram showing components of an example system 800 for enabling the improved output of multiple content items, in accordance with some implementations of the disclosure. Although FIG. 8 shows system 800 as including a number and configuration of individual components, in some examples, any number of the components of system 800 is combined and/or integrated as one device. System 800 includes computing device 802 (e.g., television 101, 301, 401 or 502, telephone 504, or content player 710), server 804 (e.g., content server 702), and content database 806 (e.g., content server 702, supplemental content server 708), each of which is communicatively coupled to communication network 808, which is the Internet or any other suitable network or group of networks. In some examples, system 800 excludes server 804, and functionality that would otherwise be implemented by server 804 is instead implemented by other components of system 800, such as computing device 802. In still other examples, server 804 works in conjunction with computing device 802 to implement certain functionality described herein in a distributed or cooperative manner.

Server 804 includes control circuitry 810 and input/output (I/O) path 812, and control circuitry 810 includes storage 814 and processing circuitry 816. Computing device 802, which can be a personal computer, a laptop computer, a tablet computer, a smartphone, a smart television, a smart speaker, or any other type of computing device, includes control circuitry 818, I/O path 820, speaker 822, display 824, and user input interface 826, which in some examples provides a user selectable option for enabling and disabling the display of modified closed captions. Control circuitry 818 includes storage 828 and processing circuitry 830. Control circuitry 810 and/or 818 is based on any suitable processing circuitry such as processing circuitry 816 and/or 830. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and includes a multi-core processor (e.g., dual-core, quad-core, hexa-core, or any suitable number of cores). In some examples, processing circuitry is distributed across multiple separate processors, for example, multiple of the same type of processors (e.g., two Intel Core i9 processors) or multiple different processors (e.g., an Intel Core i7 processor and an Intel Core i9 processor).

Each of storage 814, storage 828, and/or storages of other components of system 800 (e.g., storages of content database 806, and/or the like) is an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 814, storage 828, and/or storages of other components of system 800 is used to store various types of content, metadata, and or other types of data. Non-volatile memory also is used (e.g., to launch a boot-up routine and other instructions). Cloud-based storage is used to supplement storages 814, 828 or instead of storages 814, 828. In some examples, control circuitry 810 and/or 818 executes instructions for an application stored in memory (e.g., storage 814 and/or 828). Specifically, control circuitry 810 and/or 818 is instructed by the application to perform the functions discussed herein. In some implementations, any action performed by control circuitry 810 and/or 818 is based on instructions received from the application. For example, the application is implemented as software or a set of executable instructions that is stored in storage 814 and/or 828 and executed by control circuitry 810 and/or 818. In some examples, the application is a client/server application where only a client application resides on computing device 802, and a server application resides on server 804.

The application is implemented using any suitable architecture. For example, it is a stand-alone application wholly implemented on computing device 802. In such an approach, instructions for the application are stored locally (e.g., in storage 828), and data for use by the application is downloaded on a periodic basis (e.g., from an out-of-band feed, from an Internet resource, or using another suitable approach). Control circuitry 818 retrieves instructions for the application from storage 828 and process the instructions to perform the functionality described herein. Based on the processed instructions, control circuitry 818 determines what action to perform when input is received from user input interface 826.

In client/server-based examples, control circuitry 818 includes communication circuitry suitable for communicating with an application server (e.g., server 804) or other networks or servers. The instructions for carrying out the functionality described herein are stored on the application server. Communication circuitry includes a cable modem, an Ethernet card, or a wireless modem for communication with other equipment, or any other suitable communication circuitry. Such communication involves the Internet or any other suitable communication networks or paths (e.g., communication network 808). In another example of a client/server based application, control circuitry 818 runs a web browser that interprets web pages provided by a remote server (e.g., server 804). For example, the remote server stores the instructions for the application in a storage device. The remote server processes the stored instructions using circuitry (e.g., control circuitry 810) and/or generates displays. Computing device 802 receives the displays generated by the remote server and displays the content of the displays locally via display 824. This way, the processing of the instructions is performed remotely (e.g., by server 804) while the resulting displays are provided locally on computing device 802. Computing device 802 receives inputs from the user via input interface 826 and transmits those inputs to the remote server for processing and generating the corresponding displays.

A user sends instructions, e.g., to view an interactive media content item and/or selects one or more programming options of the interactive media content item, to control circuitry 810 and/or 818 using user input interface 826. User input interface 826 is any suitable user interface, such as a remote control, trackball, keypad, keyboard, touchscreen, touchpad, stylus input, joystick, speech recognition interface, gaming controller, or other user input interfaces. User input interface 826 is integrated with or combined with display 824, which can be a monitor, a television, a liquid crystal display (LCD), an electronic ink display, or any other equipment suitable for displaying visual images.

Server 804 and computing device 802 transmits and receives content and data via I/O path 812 and 820, respectively. For instance, I/O path 812 and/or I/O path 820 includes a communication port(s) configured to transmit and/or receive (for instance to and/or from content database 806), via communication network 808, content item identifiers, content metadata, natural language queries, and/or other data. Control circuitry 810, 818 is used to send and receive commands, requests, and other suitable data using I/O paths 812, 820. I/O paths 812 of server 800 and I/O paths 820 of computing device 802 each comprises I/O circuitry e.g., network interface, port, bus, wire.

Figure 9:
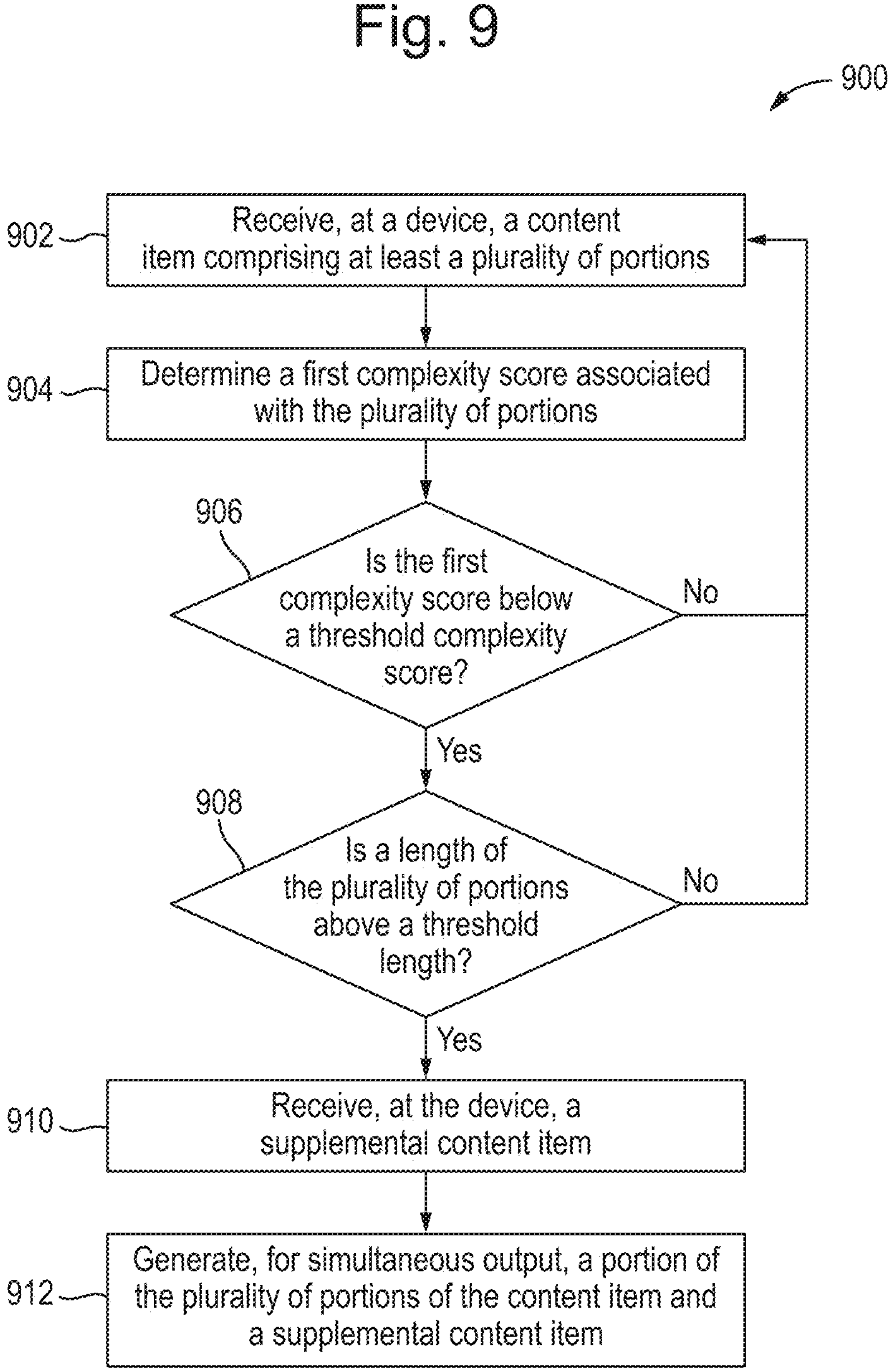
FIG. 9 depicts a flow diagram of illustrative steps involved in enabling the improved output of multiple content items, in accordance with some implementations of the disclosure.

FIG. 9 depicts another flow diagram of illustrative steps involved in enabling the improved output of multiple content items, in accordance with some implementations of the disclosure. Process 900 may be implemented, in whole or in part, on any of the aforementioned devices. In addition, one or more actions of the process 900 may be incorporated into or combined with one or more actions of any other processes or embodiments described herein.

At step 902, control circuitry of a device (e.g., a server or computing device such as television 101, 301, 401, or comprising television 502 and telephone 504, or content player 710) receives, via input/output circuitry, a content item comprising at least a plurality of portions.

At step 904, the control circuitry of the device determines a first complexity score associated with the plurality of portions.

At step 906, the control circuitry of the device determines whether the first complexity score is below a threshold complexity score. If so, the control circuitry of the device proceeds to step 908. If not, the control circuitry of the device reverts to step 902 in order to receive another plurality of portions of the content item.

At step 908, the control circuitry of the device determines whether a length of the plurality of portions is above a threshold length. If so, the control circuitry of the device proceeds to step 910. If not, the control circuitry of the device reverts to step 902 in order to receive another plurality of portions of the content item.

At step 910, the control circuitry of the device receives, via the input/output circuitry, a supplemental content item. In some instances, the control circuitry of the device determines whether a sum (for example, a weighted sum) or combination of the first complexity score and the second complexity score is below a threshold complexity score. If so, the control circuitry of the device proceeds to step 912. If not, the control circuitry of the device may revert to step 902 in order to receive another plurality of portions of the content item. Alternatively, the control circuitry of the device may revert to step 910 in order to receive another supplemental content item.

At step 912, the control circuitry of the device generates, for simultaneous output, a portion of the plurality of portions of the content item and a supplemental content item.

Figure 10:
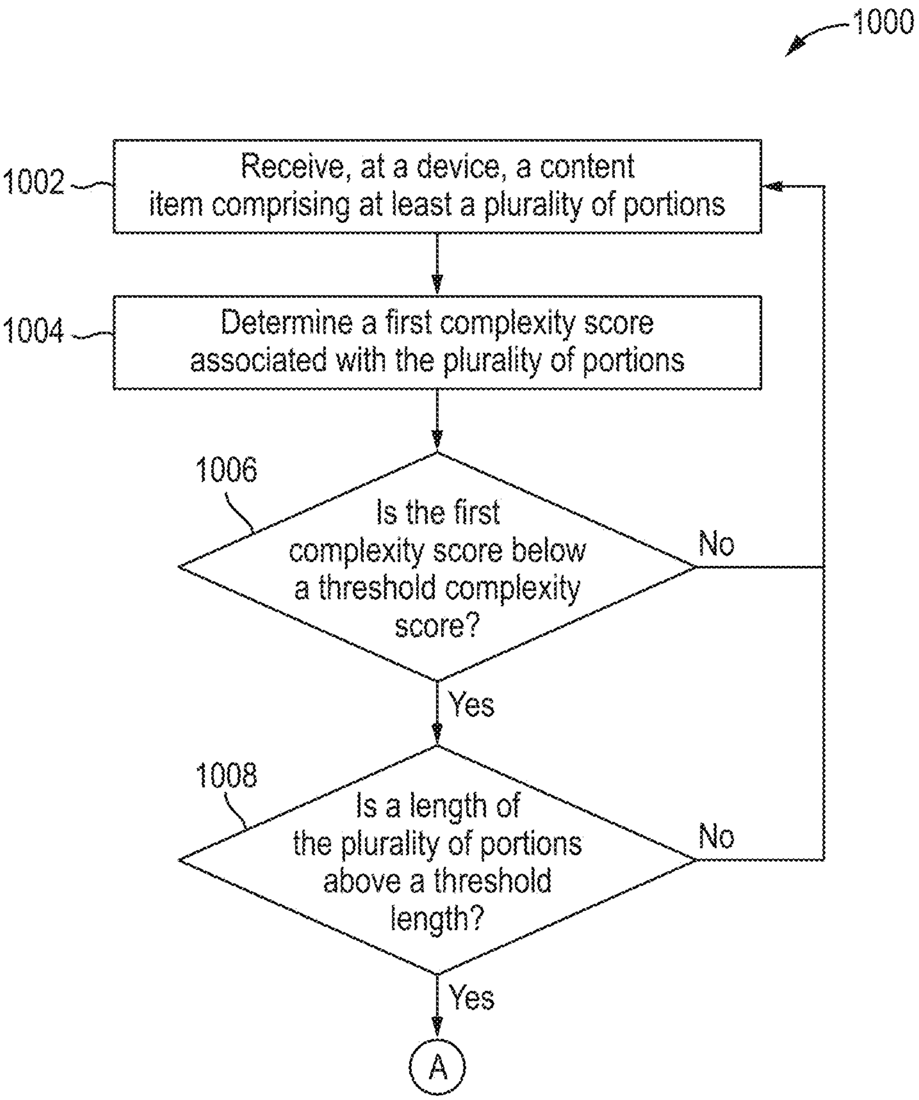
FIG. 10 depicts a flow diagram of illustrative steps involved in enabling the improved output of multiple content items, in accordance with some implementations of the disclosure.

FIG. 10 depicts another flow diagram of illustrative steps involved in enabling the improved output of multiple content items, in accordance with some implementations of the disclosure. Process 1000 may be implemented, in whole or in part, on any of the aforementioned devices. In addition, one or more actions of the process 1000 may be incorporated into or combined with one or more actions of any other processes or embodiments described herein.

At step 1002, control circuitry of a device (e.g., server or computing device such as television 101, 301 or 401 or comprising television 502 and telephone 504, or content player 710) receives, via input/output circuitry, a content item comprising at least a plurality of portions.

At step 1004, the control circuitry of the device determines a first complexity score associated with the plurality of portions.

At step 1006, the control circuitry of the device determines whether the first complexity score is below a threshold complexity score. If so, the control circuitry of the device proceeds to step 1008. If not, the control circuitry of the device reverts to step 1002 in order to receive another plurality of portions of the content item.

At step 1008, the control circuitry of the device determines whether a length of the plurality of portions is above a threshold length. If so, the control circuitry of the device proceeds to step 1010. If not, the control circuitry of the device reverts to step 1002 in order to receive another plurality of portions of the content item.

At step 1010, the control circuitry of the device receives, via the input/output circuitry, a supplemental content item.

At step 1012, the control circuitry of the device determines a second complexity score associated with the supplemental content item.

At step 1014, the control circuitry of the device determines whether a sum (for example, a weighted sum) or a combination of the first complexity score and second complexity score is below the threshold complexity score. If so, the control circuitry of the device proceeds to step 1016. Additionally or alternatively, the control circuitry of the device proceeds to step 1018. If not, the control circuitry of the device reverts to step 1010 in order to receive another supplemental content item.

At step 1016, the control circuitry of the device determines, based on the first complexity score and second complexity score, a relative display size for each of the portion and supplemental content item. The control circuitry of the device proceeds to step 1018 or step 1020.

At step 1018, the control circuitry of the device adjusts, based on the first complexity score and second complexity score, a relative volume level for each of the portion and supplemental content item. The control circuitry of the device proceeds to step 1016 (if not already implemented) or step 1020.

At step 1020, the control circuitry of the device generates, for simultaneous output, a portion of the plurality of portions of the content item and a supplemental content item.

At step 1022, the control circuitry of the device receives a command to pause the content item.

At step 1024, the control circuitry of the device pauses the content item in response to the receipt of the command to pause.

At step 1026, the control circuitry of the device receives, via the input/output circuitry, a longer version of the supplemental content item.

At step 1022, the control circuitry of the device generates, for output during the pausing of the content item, the longer version of the supplemental content item.

Figure 11:
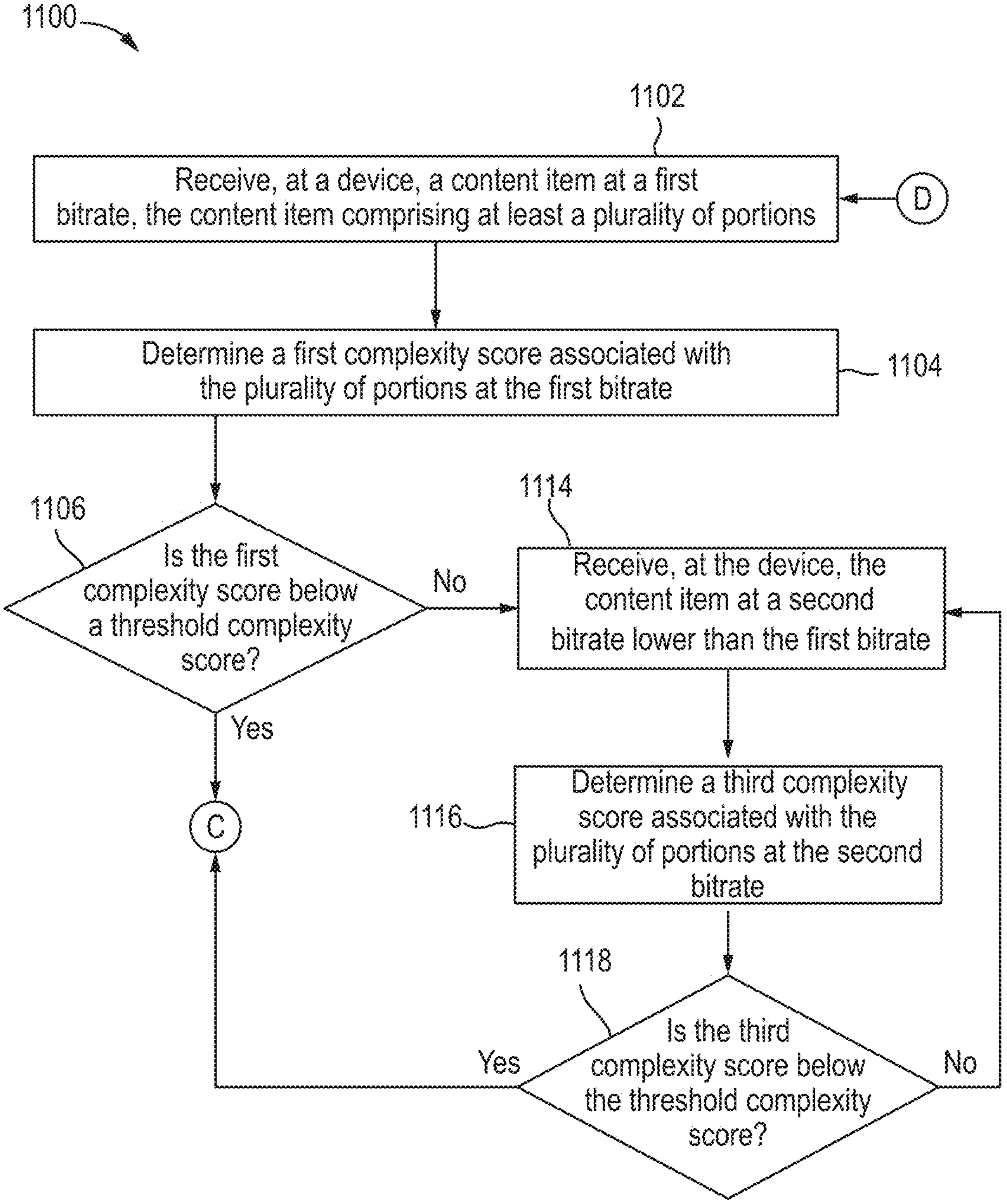
FIG. 11 depicts a flow diagram of illustrative steps involved in enabling the improved output of multiple content items, in accordance with some implementations of the disclosure.
Figure 11:
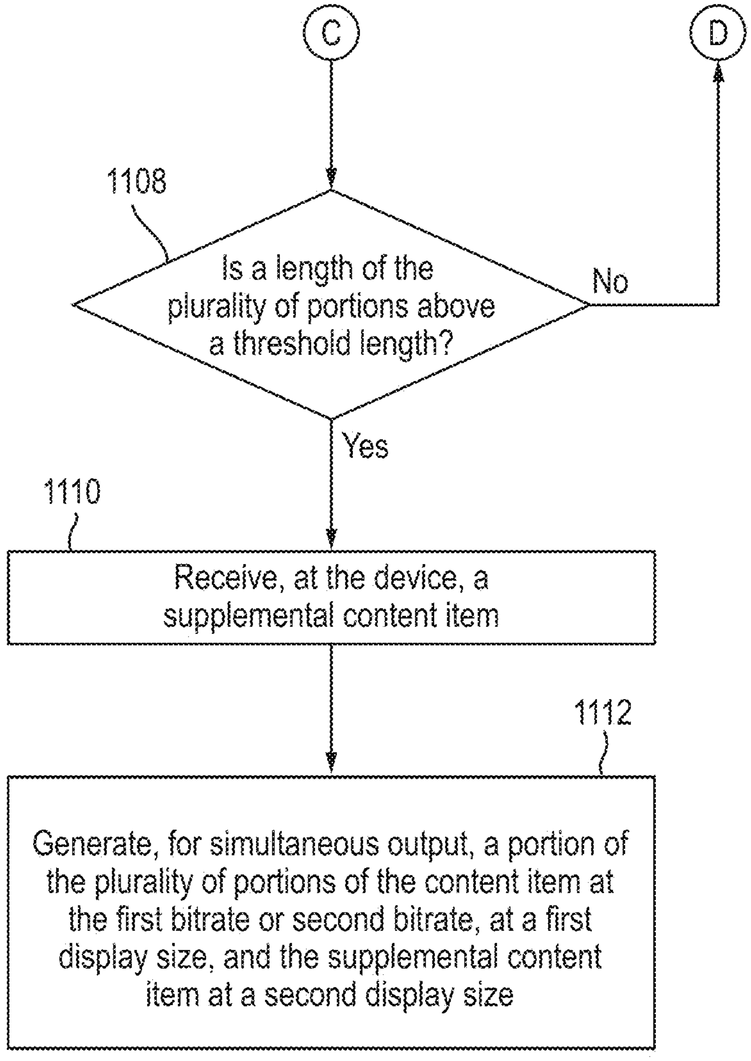

FIG. 11 depicts another flow diagram of illustrative steps involved in enabling the improved output of multiple content items, in accordance with some implementations of the disclosure. Process 1100 may be implemented, in whole or in part, on any of the aforementioned devices. In addition, one or more actions of the process 1100 may be incorporated into or combined with one or more actions of any other processes or embodiments described herein.

At step 1102, control circuitry of a device (e.g., a server or a computing device such as television 101, 301 or 401 or comprising television 502 and telephone 504, or content player 710) receives, via input/output circuitry, a content item at a first bitrate, the content item comprising at least a plurality of portions.

At step 1104, the control circuitry of the device determines a first complexity score associated with the plurality of portions at the first bitrate.

At step 1106, the control circuitry of the device determines whether the first complexity score is below a threshold complexity score. If so, the control circuitry of the device proceeds to step 1108. If not, the control circuitry of the device proceeds to step 1114.

At step 1108, the control circuitry of the device determines whether a length of the plurality of portions is above a threshold length. If so, the control circuitry of the device proceeds to step 1110. If not, the control circuitry of the device reverts to step 1102 in order to receive another plurality of portions of the content item.

At step 1110, the control circuitry of the device receives, via the input/output circuitry, a supplemental content item. In some instances, when the control circuitry proceeded through steps 1106 and 1108 to step 1110, the control circuitry of the device determines whether a sum (for example, a weighted sum) or combination of the first complexity score and the second complexity score is below the threshold complexity score. If so, the control circuitry of the device proceeds to step 1112. If not, the control circuitry of the device may revert to step 1102 in order to receive another plurality of portions of the content item at the first bitrate.

Alternatively, the control circuitry of the device may revert to step 1110 in order to receive another supplemental content item.

In some instances, when the control circuitry proceeds through steps 1114, 1116, 1118 and 1108 to step 1110, the control circuitry of the device determines whether a sum (for example, a weighted sum) or combination of the third complexity score and the second complexity score is below the threshold complexity score. If so, the control circuitry of the device proceeds to step 1112. If not, the control circuitry of the device may revert to step 1102 in order to receive another plurality of portions of the content item at the first bitrate. Alternatively, the control circuitry of the device may revert to step 1110 in order to receive another supplemental content item. Alternatively, the control circuitry of the device may revert to step 1114 in order to receive the plurality of portions of the content item at a third bitrate lower than the second bitrate.

At step 1112, the control circuitry of the device generates, for simultaneous output, a portion of the plurality of portions of the content item at the first bitrate or second bitrate, at a first display size, and the supplemental content item at a second display size. The first display size may be based on the first complexity score or the third complexity score. The second display size may be based on the second complexity score.

At step 1114, the control circuitry of the device receives, via the input/output circuitry, the content item at a second bitrate lower than the first bitrate.

At step 1116, the control circuitry of the device determines a third complexity score associated with the plurality of portions at the second bitrate.

At step 1118, the control circuitry of the device determines whether the third complexity score is below the threshold complexity score. If so, the control circuitry of the device proceeds to step 1108. If not, the control circuitry of the device reverts to step 1114 in order to receive the plurality of portions of the content item at a third bitrate lower than the second bitrate.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flow diagrams or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method, performed by a computing device, comprising:

receiving a content item comprising at least a plurality of portions;

generating at least one of the plurality of portions in a first size and a first resolution;

determining that a first complexity score associated with the plurality of portions is below a threshold complexity score;

determining that a length of the plurality of portions is above a threshold length; and based on determining that the first complexity score is below the threshold complexity score and that the length of the plurality of portions is above the threshold length, generating, for simultaneous output, (a) a portion of the plurality of portions of the content item in a second size and a second resolution and (b) a supplemental content item in a third size and a third resolution, wherein:

the third size is greater than the second size;

the second size is greater than the first size according to a proportion;

the second resolution is based on the proportion; and the supplemental content item is distinct from the content item.

2. The method of claim 1, wherein:

the method further comprises determining a second complexity score associated with the supplemental content item; and the identifying that the first complexity score is below the threshold complexity score comprises identifying that a sum of the first complexity score and the second complexity score is below the threshold complexity score.

3. The method of claim 2, wherein the generating the portion and the supplemental content item for simultaneous output further comprises:

generating the portion and the supplemental content item for display; and determining, based on the first complexity score and the second complexity score, a relative display size of the portion.

4. The method of claim 1, wherein the determining the first complexity score is based on one or more of: object analysis, color analysis, camera angle analysis, motion analysis, audio analysis and/or language analysis.

5. The method of claim 1, wherein:

the plurality of portions is a first plurality of portions, and the content item comprises a second plurality of portions consecutive to the first plurality of portions;

the method further comprises:

determining a second complexity score associated with the second plurality of portions;

identifying that the second complexity score is below the threshold complexity score;

the determining that the length of the plurality of portions is above the threshold length comprises determining that a sum of the length of the first plurality of portions and the length of the second plurality of portions is above the threshold length; and the generating the portion and the supplemental content item for simultaneous output comprises generating, for sequential output after the portion of the first plurality of portions and simultaneously with the supplemental content item, the second plurality of portions.

6. The method of claim 1, wherein the generating the portion and the supplemental content item for simultaneous output further comprises adjusting a volume level of the content item.

7. The method of claim 1, wherein the plurality of portions is a plurality of segments of the content item.

8. The method of claim 1, wherein the threshold complexity score is based on a genre of the content item.

9. The method of claim 1, wherein the method further comprises:

receiving a command to pause the content item;

in response to the receiving the command, pausing the content item;

receiving a longer version of the supplemental content item; and generating, for output during the pausing the content item, the longer version of the supplemental content item.

10. The method of claim 1, wherein:

the method further comprises receiving the content item at a first bitrate; and the generating the portion and the supplemental content item for simultaneous output further comprises:

receiving the content item at a second bitrate, wherein the second bitrate is lower than the first bitrate.

11. A system comprising a computing device having:

input/output circuitry configured to:

receive a content item comprising at least a plurality of portions; and control circuitry configured to:

generate at least one of the plurality of portions in a first size and a first resolution;

determine that a first complexity score associated with the plurality of portions is below a threshold complexity score;

determine that a length of the plurality of portions is above a threshold length; and based on determining that the first complexity score is below the threshold complexity score and that the length of the plurality of portions is above the threshold, generate, for simultaneous output, (a) a portion of the plurality of portions of the content item in a second size and a second resolution and (b) a supplemental content item in a third size and a third resolution, wherein:

the third size is greater than the second size;

the second size is greater than the first size according to a proportion;

the second resolution is based on the proportion; and the supplemental content item is distinct from the content item.

12. The system of claim 11, wherein:

the control circuitry is further configured to determine a second complexity score associated with the supplemental content item; and the control circuitry is further configured to identify that the first complexity score is below the threshold complexity score by identifying that a sum of the first complexity score and the second complexity score is below the threshold complexity score.

13. The system of claim 12, wherein the control circuitry is configured to generate the portion and the supplemental content item for simultaneous output by:

generating the portion and the supplemental content item for display; and determining, based on the first complexity score and the second complexity score, a relative display size of the portion.

14. The system of claim 11, wherein the control circuitry is further configured to determine the first complexity score is using one or more of: object analysis, color analysis, camera angle analysis, motion analysis, audio analysis and/or language analysis.

15. The system of claim 11, wherein:

the plurality of portions is a first plurality of portions, and the content item comprises a second plurality of portions consecutive to the first plurality of portions;

the control circuitry is further configured to:

determine a second complexity score associated with the second plurality of portions;

identify that the second complexity score is below the threshold complexity score;

the control circuitry is configured to:

determine that the length of the plurality of portions is above the threshold length by determining that a sum of the length of the first plurality of portions and the length of the second plurality of portions is above the threshold length; and generate the portion and the supplemental content item for simultaneous output by generating, for sequential output after the portion of the first plurality of portions and simultaneously with the supplemental content item, the second plurality of portions.

16. The system of claim 11, wherein the control circuitry is configured to generate the portion and the supplemental content item for simultaneous output by adjusting a volume level of the content item.

17. The system of claim 11, wherein the plurality of portions is a plurality of segments of the content item.

18. The system of claim 11, wherein the threshold complexity score is based on a genre of the content item.

19. The system of claim 11, wherein the control circuitry is further configured to:

receive a command to pause the content item;

in response to the receiving the command, pause the content item;

receive a longer version of the supplemental content item; and generate, for output during the pausing the content item, the longer version of the supplemental content item.

20. The system of claim 11, wherein:

the Input/Output circuitry is further configured to receive the content item at a first bitrate; and the control circuitry is configured to generate the portion and the supplemental content item for simultaneous output by:

receiving the content item at a second bitrate, wherein the second bitrate is lower than the first bitrate.

* * * * *